US009942803B2

(12) United States Patent
Ng et al.

(10) Patent No.: US 9,942,803 B2
(45) Date of Patent: Apr. 10, 2018

(54) SWITCHING TO/FROM VOICE OVER LONG TERM EVOLUTION (VOLTE) FOR A VOICE CALL

(71) Applicant: QUALCOMM Incorporated, San Diego, CA (US)

(72) Inventors: Alvin Ng, Hong Kong (HK); Chun Chung Patrick Chan, Hong Kong (HK); Tsun Sang Cheong, Hong Kong (HK); Tak Wai Wu, Hong Kong (HK)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 14/992,970

(22) Filed: Jan. 11, 2016

(65) Prior Publication Data
US 2017/0201911 A1 Jul. 13, 2017

(51) Int. Cl.
H04W 36/00 (2009.01)
H04W 36/30 (2009.01)
H04W 72/04 (2009.01)
H04B 17/309 (2015.01)
H04W 36/14 (2009.01)
H04W 36/08 (2009.01)

(52) U.S. Cl.
CPC ...... *H04W 36/0022* (2013.01); *H04B 17/309* (2015.01); *H04W 36/14* (2013.01); *H04W 36/30* (2013.01); *H04W 72/0413* (2013.01); *H04W 36/0066* (2013.01); *H04W 36/08* (2013.01)

(58) Field of Classification Search
None
See application file for complete search history.

(56) References Cited

U.S. PATENT DOCUMENTS

2014/0177592 A1 6/2014 Li et al.
2015/0094065 A1 4/2015 Su et al.
2015/0131619 A1 5/2015 Zhu et al.
2015/0181416 A1 6/2015 Dominguez et al.
(Continued)

FOREIGN PATENT DOCUMENTS

CN 104427524 A 3/2015
EP 0788255 A2 8/1997

OTHER PUBLICATIONS

3GPP, "3rd Generation Partnership Project; Technical Specification Group Radio Access Network; Evolved Universal Terrestrial Radio Access (E-UTRA); User Equipment (UE) Procedures in Idle Mode (Release 11)," 3GPP Technical Specification, Sep. 2012, 33 pgs, 3GPP TS 36.304, V11.1.0, XP050649483, 3rd Generation Partnership Project, Sophia-Antipolis Valbonne, France.
3GPP, "3rd Generation Partnership Project; Technical Specification Group GSM/Edge Radio Access Network; Radio Subsystem Link Control (Release 13)," 3GPP Technical Specification, Nov. 2015, 155 pgs, 3GPP TS 45.008, V13.0.0, XP051046553, 3rd Generation Partnership Project, Sophia-Antipolis Valbonne, France.
Huawei et al., "LTE Voice Enhancement," SA WG2 Meeting #112, TD S2-154387 (was S2-154020), Anaheim, CA, USA, Nov. 16-20, 2015, 4 pgs., XP051035873, 3rd Generation Partnership Project.
(Continued)

*Primary Examiner* — Erika Washington
(74) *Attorney, Agent, or Firm* — Holland & Hart LLP

(57) ABSTRACT

A method, an apparatus, and a computer program product for wireless communication are provided. The apparatus may determine that a voice over long term evolution (VoLTE) service has encountered a threshold quantity of failures within a particular period of time. The apparatus may transfer from a VoLTE mode associated with the VoLTE service to another mode for a voice call based on determining that the VoLTE service has encountered the threshold quantity of failures within the particular period of time.

28 Claims, 13 Drawing Sheets

(56) References Cited

U.S. PATENT DOCUMENTS

2015/0271690 A1* 9/2015 Vashi ............... H04W 88/06
370/328
2015/0358477 A1 12/2015 Jeong et al.
2017/0055197 A1* 2/2017 Shukair ............ H04W 36/165

OTHER PUBLICATIONS

Huawei et al., "How to Return to LTE for CSFB," 3GPP SA WG2 Meeting #94, S2-124296, New Orleans, USA, Nov. 12-16, 2012, 4 pgs., XP050683964, 3rd Generation Partnership Project.

Huawei et al., "Solution for Challenging VoLTE Coverage," 3GPP Draft S2-153080, Oct. 19, 2015, 12 pgs, XP051044944, 3rd Generation Partnership Project, Sophia-Antipolis Cedex, France. Retrieved from the Internet: URL:http://www.3gpp.org/ftp/Meetings_3GPP_SYNC/SA2/Docs/—[retrieved on Oct. 19, 2015].

ISA/EP, International Search Report and Written Opinion of the International Searching Authority, Int'l Application No. PCT/US2016/065890, dated May 31, 2017, European Patent Office, Rijswijk, NL, 32 pgs.

ISA/EPO, Partial International Search Report of the International Searching Authority, Int'l. App. No. PCT/US2016/065890, dated Mar. 15, 2017, European Patent Office, Rijswijk, NL, 10 pgs.

Rankin et al., "Validating VoLTE: A Definitive Guide to Successful Deployments," IXIA, Aug. 1, 2013, 141 pgs, 915-4020-01, Retrieved from the Internet: URL: http:ffwww.gsma.comjnetwork2020/wpcontent/uploads/2013/11/validatingvoltefirstedition.pdf [retrieved on Feb. 23, 2017].

* cited by examiner

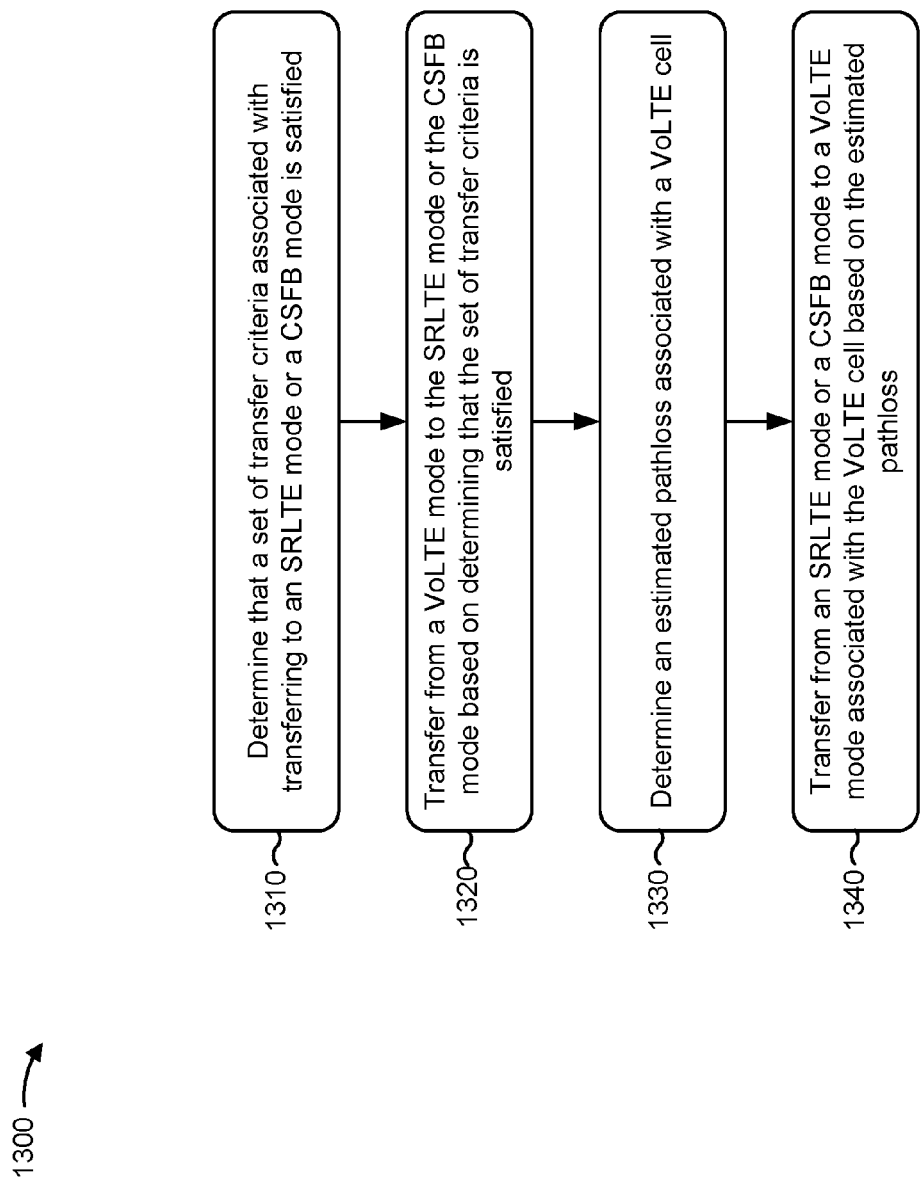

SWITCHING TO/FROM VOICE OVER LONG TERM EVOLUTION (VOLTE) FOR A VOICE CALL

BACKGROUND

Field of the Disclosure

The present disclosure relates generally to communication systems, and more particularly, to switching to/from voice over long term evolution (VoLTE) for a voice call.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems (e.g., CDMA2000 1× (1×) systems), time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method and a device are provided.

In some aspects, the method may include determining, by a user equipment (UE), that a voice over long term evolution (VoLTE) service has encountered a threshold quantity of failures within a particular period of time. The method may include transferring, by the UE, from a VoLTE mode associated with the VoLTE service to another mode for a voice call based on determining that the VoLTE service has encountered the threshold quantity of failures within the particular period of time.

In some aspects, the method may include determining, by a user equipment (UE) and after transferring to a single radio long term evolution (SRLTE) mode or a circuit switched fall back (CSFB) mode, an estimated pathloss associated with a voice over long term evolution (VoLTE) cell. The method may include transferring, by the UE, from the SRLTE mode or the CSFB mode to a VoLTE mode associated with the VoLTE cell based on the estimated pathloss.

In some aspects, the device may include one or more processors configured to determine that a voice over long term evolution (VoLTE) service has encountered a threshold quantity of failures within a particular period of time. The one or more processors may be configured to transfer from a VoLTE mode associated with the VoLTE service to another mode for a voice call based on determining that the VoLTE service has encountered the threshold quantity of failures within the particular period of time.

In some aspects, the device may include one or more processors configured to determine, after transferring to a single radio long term evolution (SRLTE) mode or a circuit switched fall back (CSFB) mode, an estimated pathloss associated with a voice over long term evolution (VoLTE) cell. The one or more processors may be configured to transfer from the SRLTE mode or the CSFB mode to a VoLTE mode associated with the VoLTE cell based on the estimated pathloss.

BRIEF DESCRIPTION OF THE DRAWINGS

FIG. 13 is a flow chart of a method of wireless communication.

DETAILED DESCRIPTION

Figure 1:
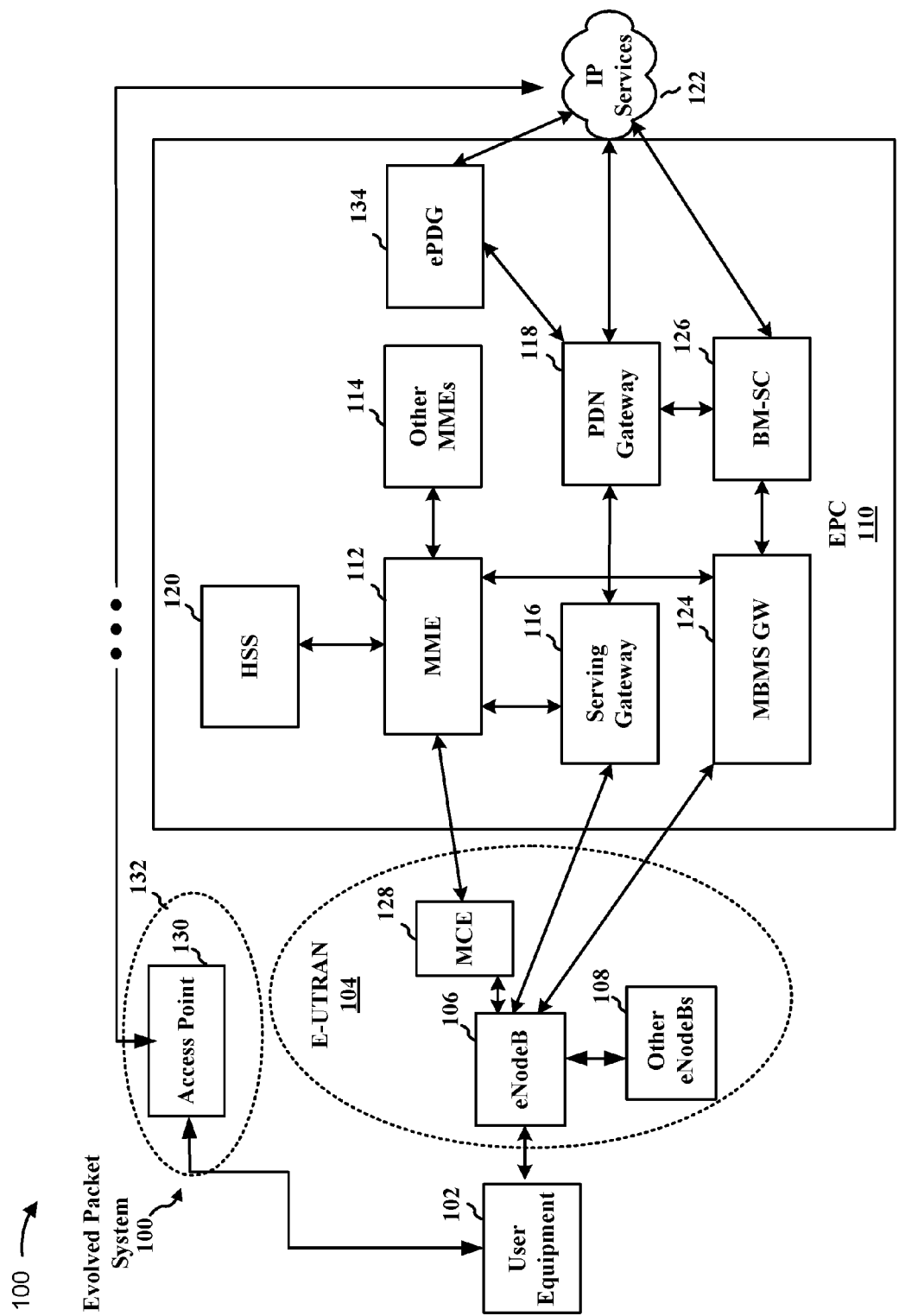
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a non-transitory computer-readable medium. Such computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

A user equipment (UE) may support multiple modes. For example, as a first mode, the UE may support a voice over long term evolution (VoLTE) mode. Further to the example, as a second mode, the UE may support a single radio long term evolution (SRLTE) mode or a circuit-switched fallback (CSFB) mode. The VoLTE mode may be a preferred mode relative to the SRLTE mode or the CSFB mode. The preferred mode may refer to a mode that is to be selected when the multiple modes are available. For example, when connecting to a network, the UE may select to the VoLTE mode rather than the SRLTE mode or the CSFB mode when the VoLTE mode and the SRLTE mode or the CSFB mode are available.

When connected to the VoLTE mode, the UE may encounter a failure based on one or more events. For example, an error associated with Internet Protocol (IP) multimedia subsystem (IMS) signaling may cause the UE to undergo a failure. Similarly, the UE may be released by a network to which the UE is connected, causing the UE to undergo a failure. Similarly, a level of network congestion exceeding a threshold may cause the network to be unable to assign network resources to the UE, causing the UE to undergo a failure. Similarly, a scheduling issue with an evolved Node B (eNB) may cause the UE to undergo a failure. Similarly, a signal characteristic failing to satisfy a signal characteristic criterion, such as a signal strength failing to exceed a signal strength threshold (e.g., at an edge of a cell area) may cause the UE to undergo a failure.

The UE may trigger a switch from the preferred VoLTE mode to a less preferred mode, such as the SRLTE mode or the CSFB mode, based on one or more transfer criteria. For example, the UE may switch from the VoLTE mode when VoLTE registration fails, when a silent redial procedure on a 1× network call ends, upon powering up and detecting only a 1× network, upon a wireless priority service (WPS) call ending, or the like. However, the UE may fail to trigger a switch when a failure occurs but the one or more transfer criteria are not satisfied. This may cause the UE to repeatedly attempt to reconnect to the preferred VoLTE mode despite having undergone a failure while connected to the preferred VoLTE mode, thereby preventing a user from placing a voice call, reducing network performance based on excessive signaling, and increasing power consumption of the UE. Techniques are described herein that permit the UE to switch from the preferred VoLTE mode to an SRLTE mode or a CSFB mode based on undergoing a threshold quantity of failures. In this way, the UE can place a voice call via the SRLTE mode or the CSFB mode and avoids repeated attempts to connect to the VoLTE mode.

Techniques are described in which the UE may, after transferring from a VoLTE mode to an SRLTE mode or a CSFB mode of a first cell, transfer to a second cell providing a VoLTE mode. In this way, the UE may return to the preferred VoLTE mode. Techniques are described herein in which the UE may determine an estimated pathloss associated with the second cell, and may transfer to the second cell based on the estimated pathloss. In this way, the UE reduces a likelihood that the UE connects to a cell with which the UE is unable to place a voice call, thereby resulting in improved user experience and an avoidance of voice call failure. Moreover, the UE reduces signaling relative to the UE being caused to undergo a failure when connected via a VoLTE mode to a particular cell and repeatedly attempting to select back to the VoLTE mode of the particular cell.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, an Operator's Internet Protocol (IP) Services 122, and a wireless local area network (WLAN) access point 130. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the eNB 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMES 114, a Serving Gateway 116, a Multimedia Broadcast Multicast Service (MBMS) Gateway 124, a Broadcast Multicast Service Center (BM-SC) 126, a Packet Data Network (PDN) Gateway 118, and an evolved PDN gateway (ePDG) 134. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

The ePDG 134 may connect to the PDN Gateway 118 and serve to create an IP security (IPsec) tunnel to the UE 102 when utilizing an untrusted wireless local area network (WLAN) access connection (e.g., a Wi-Fi connection). Integration of a Wi-Fi access connection into the EPC 110 facilitates mobile services (e.g., IMS-based voice and video calling, multimedia messaging service (MIMS), short message service (SMS), or the like) being available to the UE 102 when the UE 102 is utilizing the WLAN access connection. The WLAN (e.g., Wi-Fi) access may include trusted Wi-Fi access (e.g., where the UE 102 may connect directly to the PDN Gateway 118 via an S2a interface using general packet radio service (GPRS) tunneling protocol (GTP)), an untrusted Wi-Fi access (e.g., where the UE 102 may connect via the IPsec tunnel established between the ePDG 134 using an SWn interface and with the ePDG 134 forwarding network traffic to the PDN Gateway 118 via an S2b interface using GTP).

The UE 102 may connect to E-UTRAN 104 via a particular connection mode associated with a particular voice service for a voice call. For example, with regard to E-UTRAN 104, UE 102 may connect via a VoLTE mode of eNB 106 providing a VoLTE service. In some aspects, the access point 130 may connect to one or more other devices, such as one or more devices of EPC 110, E-UTRAN 104, or the like. Non-LTE radio access technology (RAT) 132 may be a GSM based RAT, a 1× based RAT, or the like. Additionally, or alternatively, non-LTE RAT 132 may be a UMTS based RAT, a wireless local area network (WLAN) based RAT (e.g., a Wi-Fi based RAT), an intelligent WLAN (IWLAN) based RAT, a CDMA based RAT, or the like. In some aspects, when a threshold quantity of failures are detected by the UE 102 when the UE 102 is connected via a first mode provided by eNB 106, such as a VoLTE mode, the UE 102 may switch from the first mode provided by the eNodeB 106, to a second mode. Similarly, when connected via the second mode, UE 102 may return to the first mode provided by another eNB, such as one of the other eNBs 108.

Figure 2:
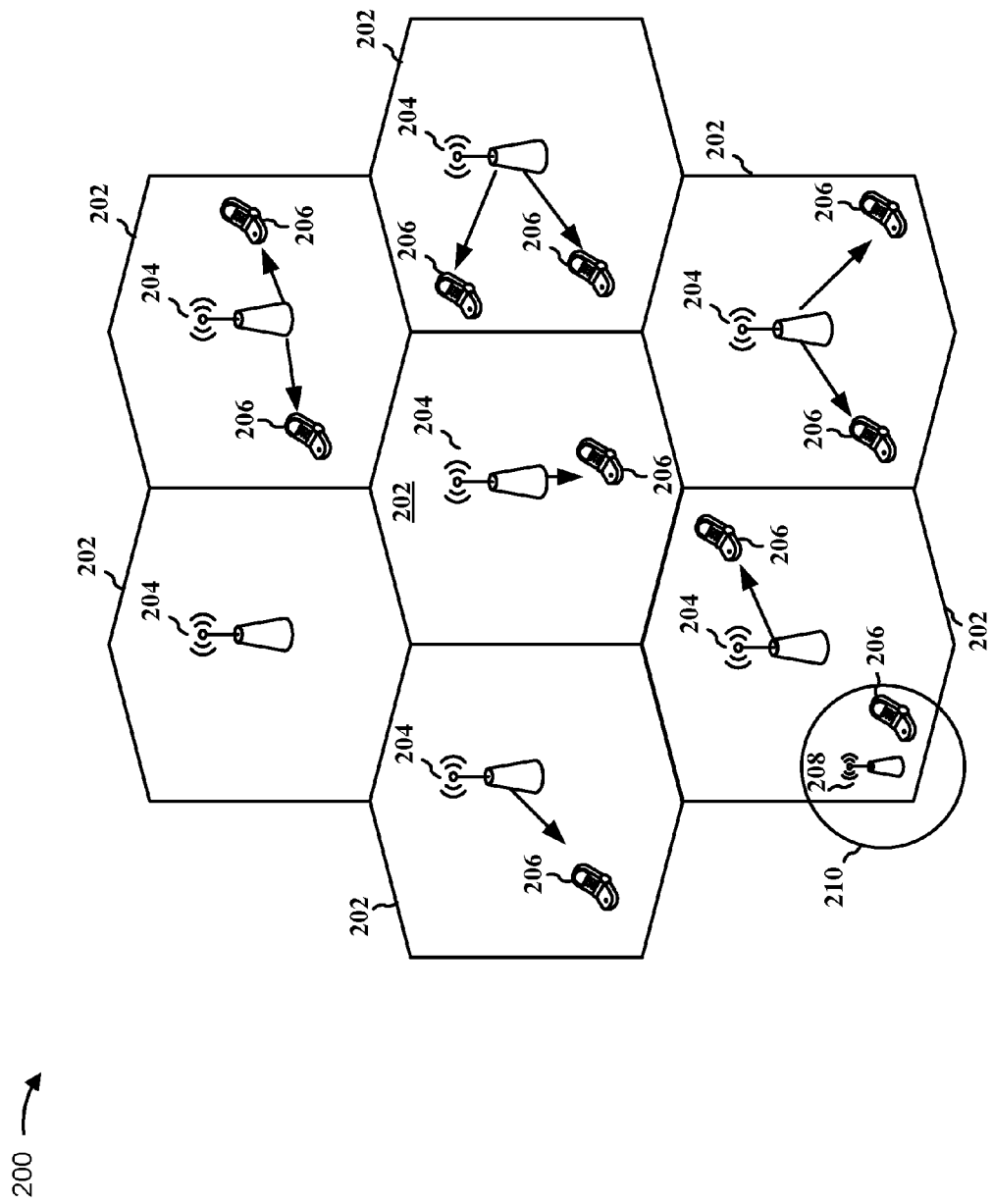
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. At a cell edge, UE 206 may determine that signal strength of a particular eNB 204 fails to satisfy a threshold, and may be triggered to transfer from a first mode of the particular eNB 204 to a second mode of the particular eNB 204. UEs 206 may undergo handoffs from a first eNB 208 to a second eNB 208, from the first eNB 208 to a macro eNB 204, from the macro eNB 204 or the eNB 208 to an access point (e.g., the access point 130 of FIG. 1, etc.), or the like.

With regard to switching from a VoLTE mode to another mode, such as an SRLTE mode or a CSFB mode, a particular one of the UEs 206 may be in communication with one or more of eNBs 204, eNBs 208 or the like and, in accordance with aspects disclosed herein, transfer from the VoLTE mode to the other mode. After transferring from the VoLTE mode to the other mode, the particular one of the UEs 206 may determine a pathloss estimation associated with another one of the one or more eNBs 204, eNBs 208, or the like and may transfer to the other one of the one or more eNBs 204, 208 to return to the VoLTE mode. In some aspects, the particular one of the UEs 206 may perform the pathloss estimation without transmitting information to or receiving information from the other one of the one or more UEs 206.

There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 (e.g., 1x) and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
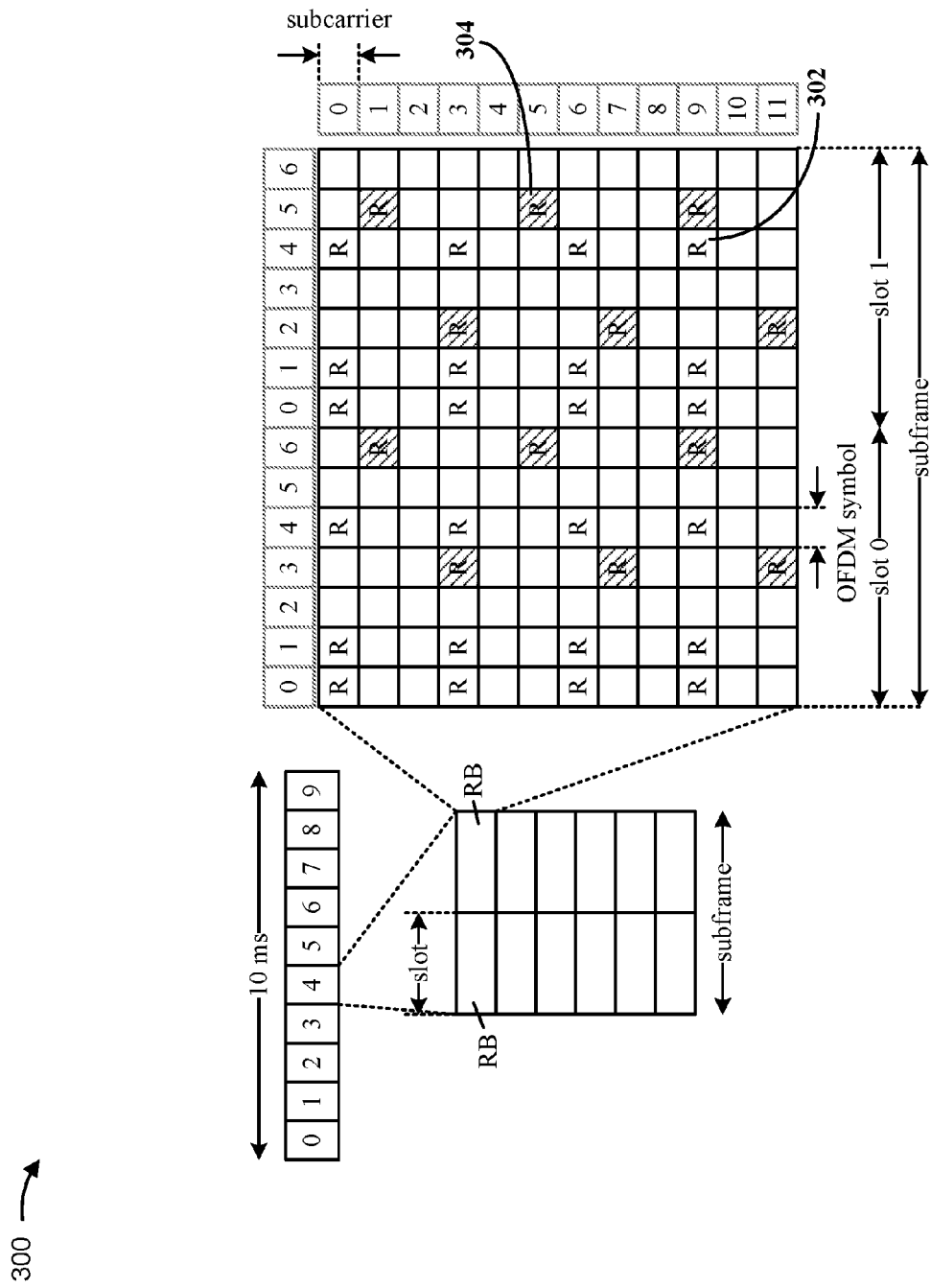
FIG. 3 is a diagram illustrating an example of a downlink (DL) frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

According to some aspects disclosed herein, a UE, such as UE 206 in FIG. 2, may process information associated with a DL LTE frame to perform a transfer from a VoLTE mode to another mode or from the other mode to the VoLTE mode. For example, the UE may identify a signal strength associated with the DL LTE frame, may determine that the signal strength satisfies a threshold and may perform the transfer from the VoLTE mode to the other mode or from other mode to the VoLTE mode based on determining that the signal strength satisfies the threshold. In this way, the UE increases a likelihood of successfully placing a voice call after transferring relative to transferring without determining the signal strength or failing to transfer.

Figure 4:
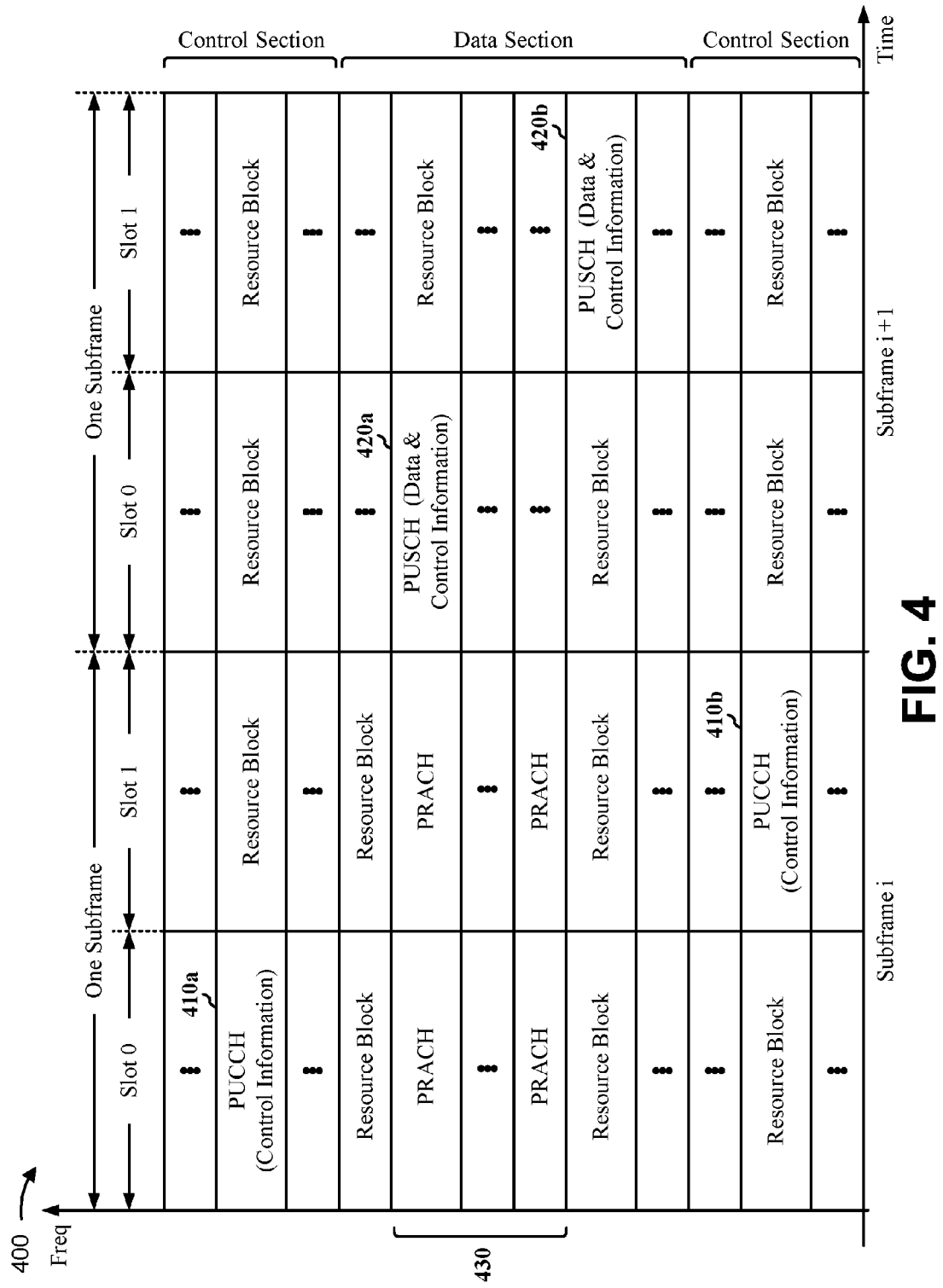
FIG. 4 is a diagram illustrating an example of an uplink (UL) frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

According to some aspects disclosed herein, the UE may utilize a portion of the UL LTE frame when performing a transfer from a VoLTE mode to another mode or from the other mode to the VoLTE mode. For example, the UE may provide information associated with causing the UE to transfer from the VoLTE mode to the other mode or from the other mode to the VoLTE mode.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. In some aspects, there is no frequency hopping for the PRACH. The PRACH attempt is carried in a single subframe (1 ms) or in a sequence of few contiguous subframes and a UE can make a single PRACH attempt per frame (10 ms).

Figure 5:
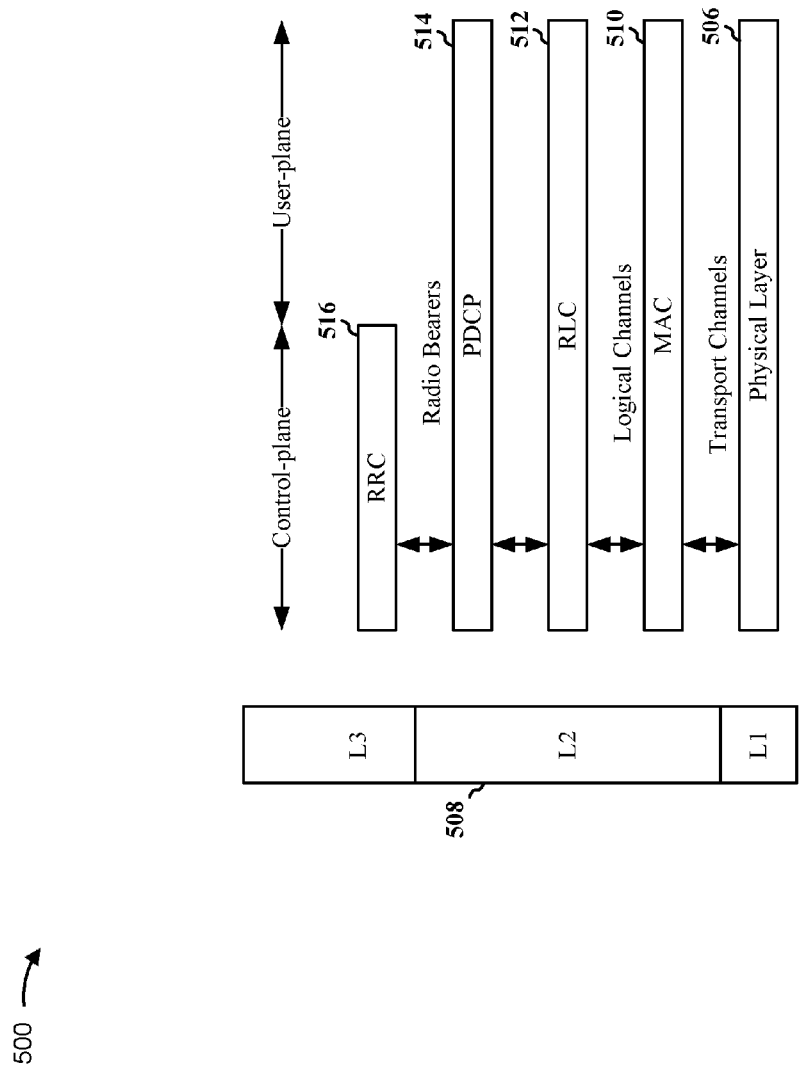
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506. In some aspects, the UE may cause a transfer from a VoLTE mode to another mode or from the other mode to the VoLTE mode based on information associated with the L1, L2, and/or L3 layers, such as signaling information, communication rate information, or the like.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
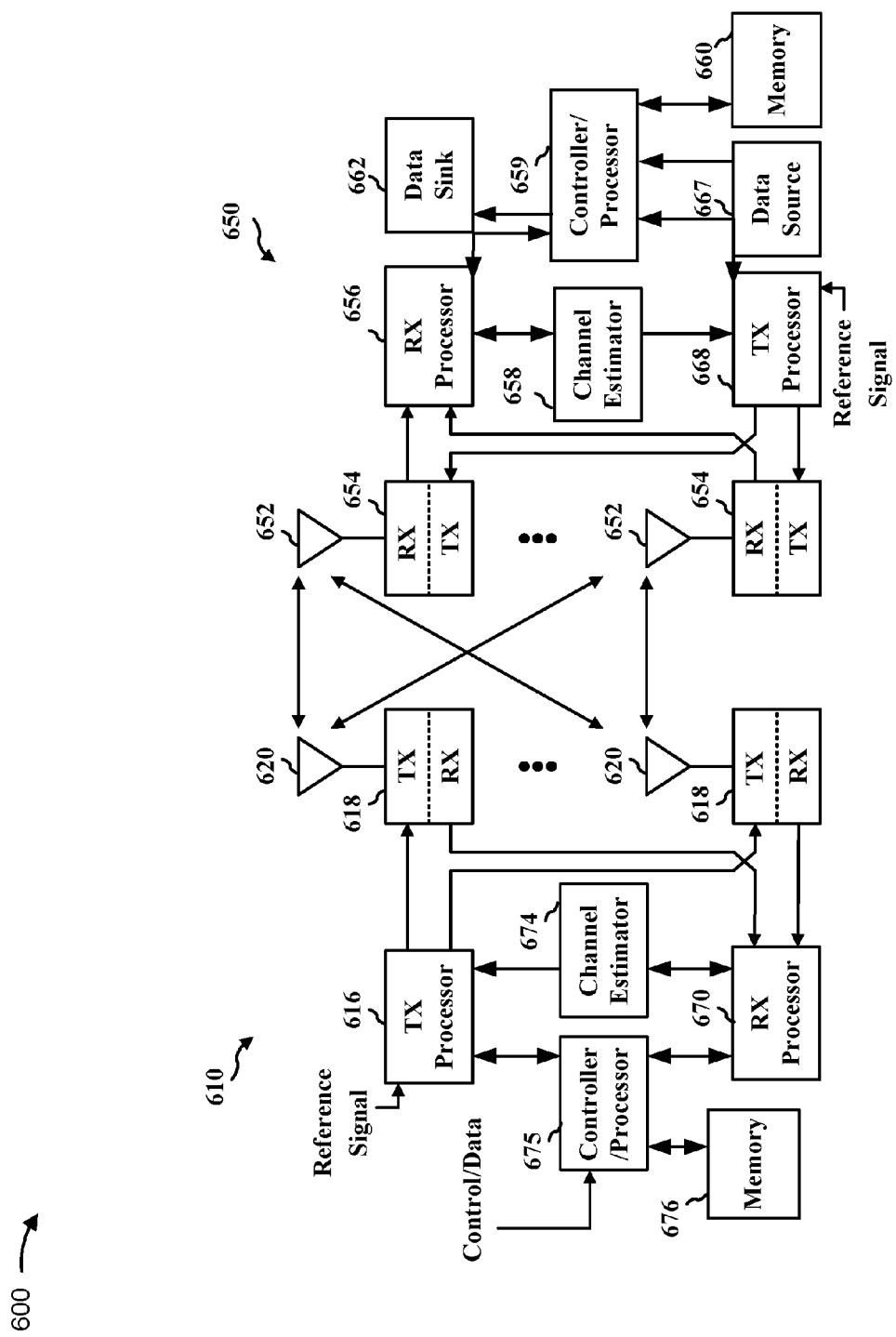
FIG. 6 is a diagram illustrating an example of an evolved Node B (eNB) and a user equipment (UE) in an access network.

FIG. 6 is a block diagram 600 of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. For example, a receiver 654RX may recover information signaling a VoLTE failure, a transfer from a VoLTE mode to another mode, a transfer from the other mode to the VoLTE mode, or the like. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. For example, packets associated with signaling a VoLTE failure, a transfer from a VoLTE mode to another mode, a transfer from the other mode to the VoLTE mode, or the like. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
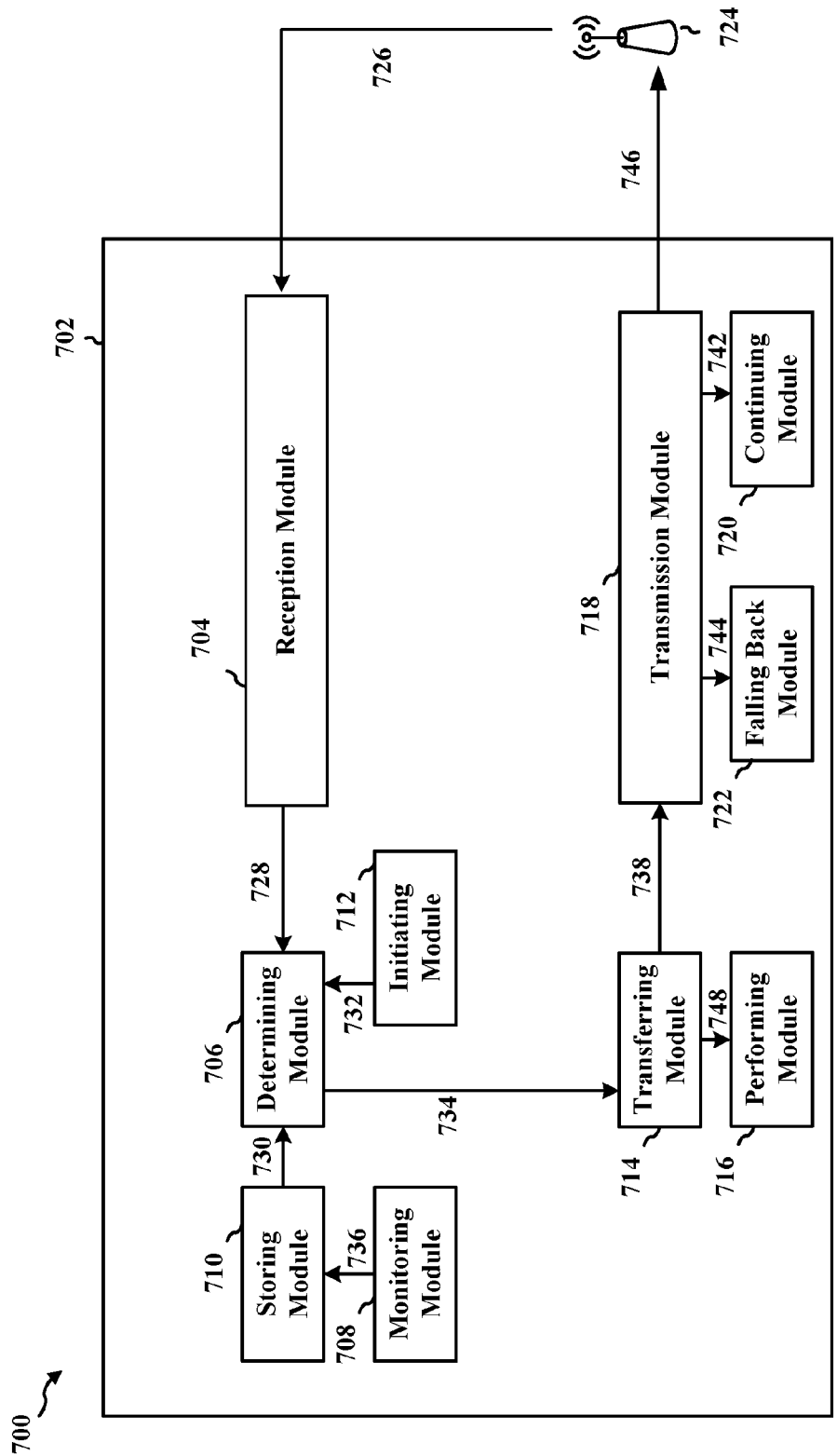
FIG. 7 is a conceptual data flow diagram illustrating the data flow between different modules/means/components in an example apparatus.

FIG. 7 is a conceptual data flow diagram 700 illustrating the data flow between different modules/means/components in an example apparatus 702. The apparatus may be a UE. As shown, apparatus 702 may include a reception module 704, a determining module 706, a monitoring module 708, a storing module 710, an initiating module 712, a transferring module 714, a performing module 716, a transmission module 718, a continuing module 720, and a falling back module 722.

The reception module 704 may receive, as input from eNB 724 (e.g., which may include one or more of the eNBs 106, 108 of FIG. 1, the access point 130 of FIG. 1, the eNBs 204, 208 of FIG. 2, and/or the eNB 610 of FIG. 6), data 726. The reception module 704 may receive information associated with a transfer from a first mode to a second mode (e.g., from a VoLTE mode to an SRLTE mode or a CSFB mode, from the SRLTE mode or the CSFB mode to the VoLTE mode, etc.), from a first cell to a second cell (e.g., from a first cell providing a VoLTE mode and an SRLTE mode or a CSFB mode to a second cell providing a VoLTE mode), or the like. For example, based on transmitting a request for a transfer from an SRLTE mode of a first cell to a VoLTE mode of a second cell, reception module 704 may receive a confirmation that apparatus 702 is transferred to the VoLTE mode of the second cell. As shown, reception module 704 may provide data 728 (e.g., which may be processed by reception module 704) as output to determining module 706 (e.g., as data 728).

The determining module 706 may receive data 728 from reception module 704, data 730 from storing module 710, and/or data 732 from initiating module 712. Based on data 728, data 730, and/or data 732, determining module 706 may determine that a VoLTE service has undergone a threshold quantity of failures within a particular period of time. In some aspects, determining module 706 may determine that apparatus 702 is unable to perform a voice call via a VoLTE service. In some aspects, determining module 706 may determine that a signal measurement satisfies one or more signal measurement criteria. In some aspects, determining module 706 may determine a signal characteristic associated with a VoLTE mode, and may determine that the signal characteristic does not satisfy one or more signal characteristic criteria. In some aspects, determining module 706 may determine, after transferring from the VoLTE mode to another mode, a signal characteristic associated with the VoLTE mode, and may determine that the signal characteristic satisfies one or more signal characteristic criteria.

In another configuration, based on data 728, data 730, and/or data 732, determining module 706 may determine, after transferring to an SRLTE mode or a CSFB mode, an estimated pathloss associated with a VoLTE cell (e.g., associated with eNB 724). In some aspects, determining module 706 may determine a receiver sensitivity associated with the VoLTE cell, and may determine an uplink transmission power for apparatus 702 based on the receiver sensitivity associated with the VoLTE cell and an estimated pathloss associated with the VoLTE cell. In some aspects, determining module 706 may determine that a set of transfer criteria associated with transferring to an SRLTE mode or a CSFB mode is satisfied. As shown, determining module 706 may provide data 728, data 730, and/or data 732 (e.g., which may be processed by determining module 706) as output to transferring module 714 (e.g., as data 734).

The monitoring module 708 may monitor a call attempt. In some aspects, monitoring module 708 may monitor the call attempt based on receiving data from reception module 704 (e.g., not shown). Monitoring module 708 may provide output to storing module 710 (e.g., as data 736).

The storing module 710 may receive data 736 as input from monitoring module 708. Based on data 736, storing module 710 may store information identifying a failure associated with a call attempt. For example, storing module 710 may store information associated with determining that a threshold quantity of failures (e.g., consecutive failures, failures within a threshold period of time, etc.) have occurred when apparatus 702 is connected to a VoLTE mode. As shown, storing module 710 may provide data 736 (e.g., which may be processed by storing module 710) as output to determining module 706 (e.g., as data 730).

The initiating module 712 may initiate a signal measurement associated with a mode (e.g., an SRLTE mode or a CSFB mode). In some aspects, initiating module 712 may initiate the signal measurement based on information received from monitoring module 708, reception module 704, or the like (e.g., not shown). As shown, initiating module 712 may provide output to determining module 706 (e.g., as data 732).

The transferring module 714 may receive data 734 as input from determining module 706. Based on data 734, transferring module 714 may transfer apparatus 702 from a VoLTE mode associated with a VoLTE service to another mode (e.g., an SRLTE mode or a CSFB mode) for a voice call based on determining that the VoLTE service has undergone a threshold quantity of failures within a particular period of time. In some aspects, transferring module 714 may transfer, after transferring from a VoLTE mode associated with a first VoLTE service (e.g., associated with a first cell) to another mode, from the other mode to a VoLTE mode associated with a second VoLTE service (e.g., associated with a second cell). In some aspects, transferring module 714 may transfer from a VoLTE mode to another mode based on determining that apparatus 702 is unable to perform a voice call. In some aspects, transferring module 714 may transfer from a VoLTE mode to another mode based on determining that a signal measurement (e.g., a signal measurement of the other mode) satisfies one or more signal measurement criteria. In some aspects, transferring module 714 may transfer from a VoLTE mode to another mode based on determining that a signal characteristic (e.g., a signal characteristic of the VoLTE mode) does not satisfy one or more signal characteristic criteria. In some aspects, transferring module 714 may transfer from another mode to a VoLTE mode based on determining that a signal characteristic (e.g., of the VoLTE mode) satisfies one or more signal characteristic criteria.

In another configuration, based on data 734, transferring module 714 may transfer from an SRLTE mode or a CSFB mode to a VoLTE mode associated with a VoLTE cell based on an estimated pathloss (e.g., associated with the VoLTE cell). In some aspects, transferring module 714 may transfer from an SRLTE mode or a CSFB mode to a VoLTE mode based on determining that an uplink transmission power (e.g., an open loop transmission power) for apparatus 702 satisfies a power threshold. In some aspects, transferring module 714 may transfer from a VoLTE mode to an SRLTE mode or a CSFB mode (e.g., before determining an estimated pathloss associated with triggering a transfer from the SRLTE mode or the CSFB mode to the VoLTE mode) based on determining that a set of transfer criteria is satisfied (e.g., apparatus 702 undergoing a threshold quantity of failures, associated with the VoLTE mode, within a particular period of time; apparatus 702 being unable to perform a voice call via the VoLTE mode; a signal measurement, associated with the SRLTE mode or the CSFB mode, satisfying one or more signal measurement criteria; or a signal characteristic, associated with the VoLTE mode, failing to satisfy one or more signal characteristic criteria). As shown, transferring module 714 may provide data 734 (e.g., which may be processed by transferring module 714) as output to performing module 716 (e.g., as data 748) and/or to transmission module 718 (e.g., as data 738).

The performing module 716 may receive data 748 as input from transferring module 714. Based on data 736, performing module 716 may perform a voice call via an SRLTE mode or a CSFB mode (e.g., after transferring to the SRLTE mode or the CSFB mode from a VoLTE mode). In some aspects, performing module 716 may perform a voice call via a VoLTE mode.

The transmission module 718 may receive data 738 as input from transferring module 714. Based on data 738, transmission module 718 may transmit information to a cell associated with a particular mode (e.g., an SRLTE mode or a CSFB mode) to attempt to register apparatus 702 for service via the particular mode. As shown, transmission module 718 may provide data 738 (e.g., which may be processed by transmission module 718) as output to continuing module 720 (e.g., as data 742), to falling back module 722 (e.g., as data 744) and/or to eNB 724 (e.g., as data 746).

The continuing module 720 may receive data 742 as input from transmission module 718. Based on data 742, continuing module 720 may cause apparatus 702 to continue to utilize a particular mode (e.g., an SRLTE mode or a CSFB mode) based on apparatus 702 successfully registering for service via the mode. For example, apparatus 702 may connect to eNB 724 via the mode to utilize the service associated with the mode and may, based on successfully registering for the service, continue to utilize the mode rather than returning to a previous mode (e.g., a VoLTE mode) from which apparatus 702 transferred.

The falling back module 722 may receive data 744 as input from transmission module 718. Based on data 744, falling back module 722 may cause apparatus 702 to fall back to a VoLTE mode (e.g., from another mode, such as an SRLTE mode or a CSFB mode) based on apparatus 702 unsuccessfully registering for service via the other mode. For example, apparatus 702 may transfer from the VoLTE mode to an SRLTE mode, may attempt to register for an SRLTE service via the SRLTE mode after transferring to the SRLTE mode, may receive information indicating that registration is unsuccessful, and may return to the VoLTE mode to utilize a VoLTE service.

Figure 10:
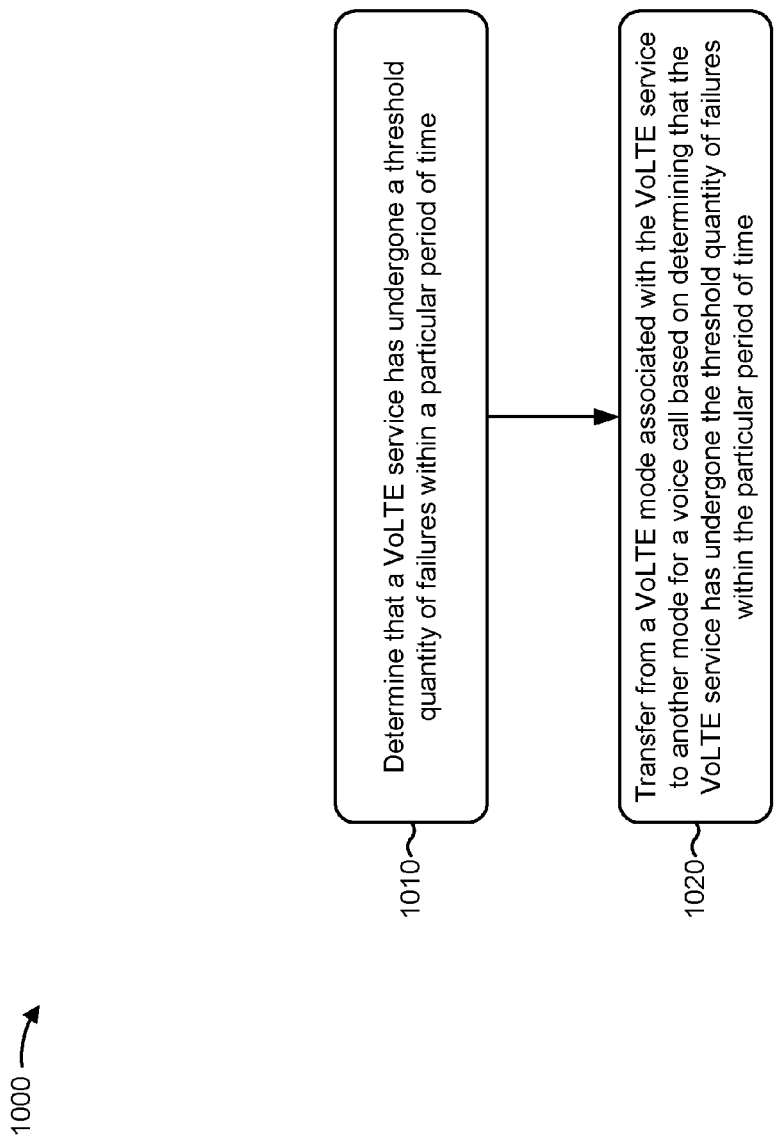
FIG. 10 is a flow chart of a method of wireless communication.
Figure 11:
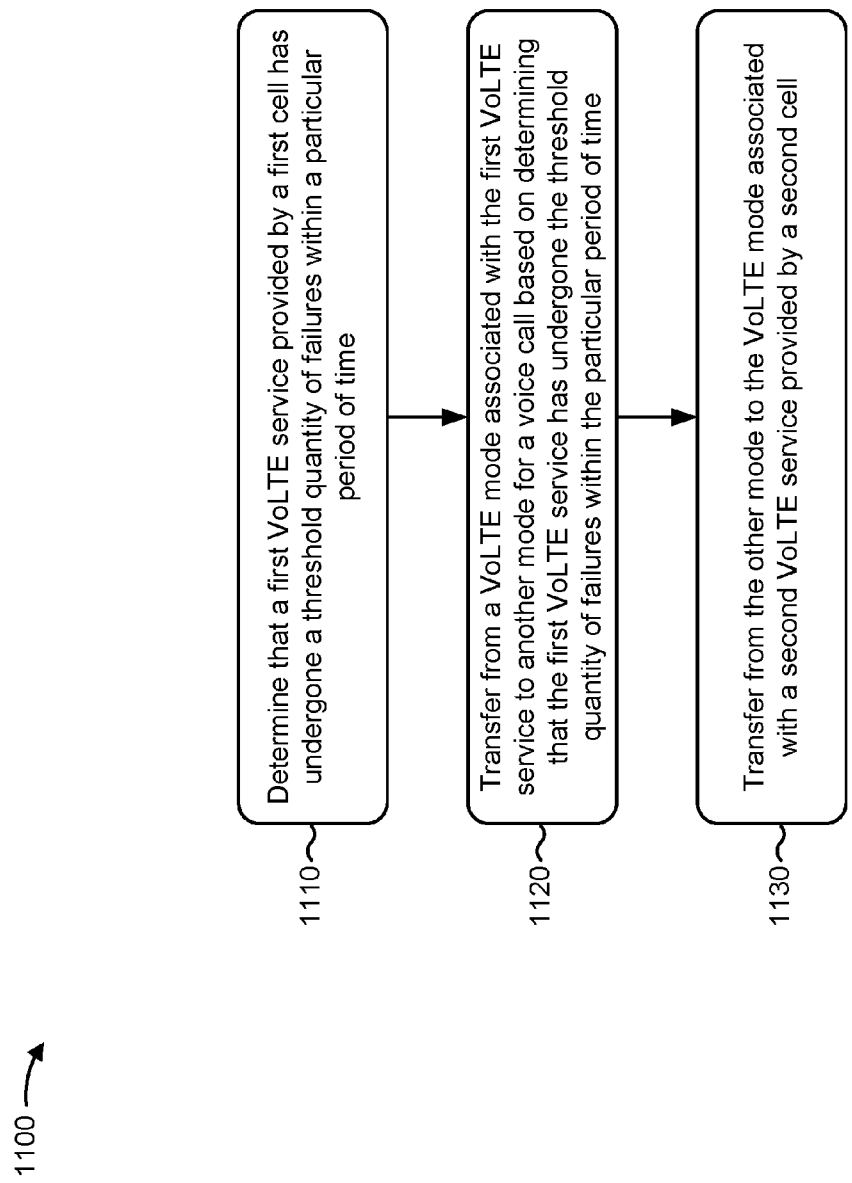
FIG. 11 is a flow chart of a method of wireless communication.
Figure 12:
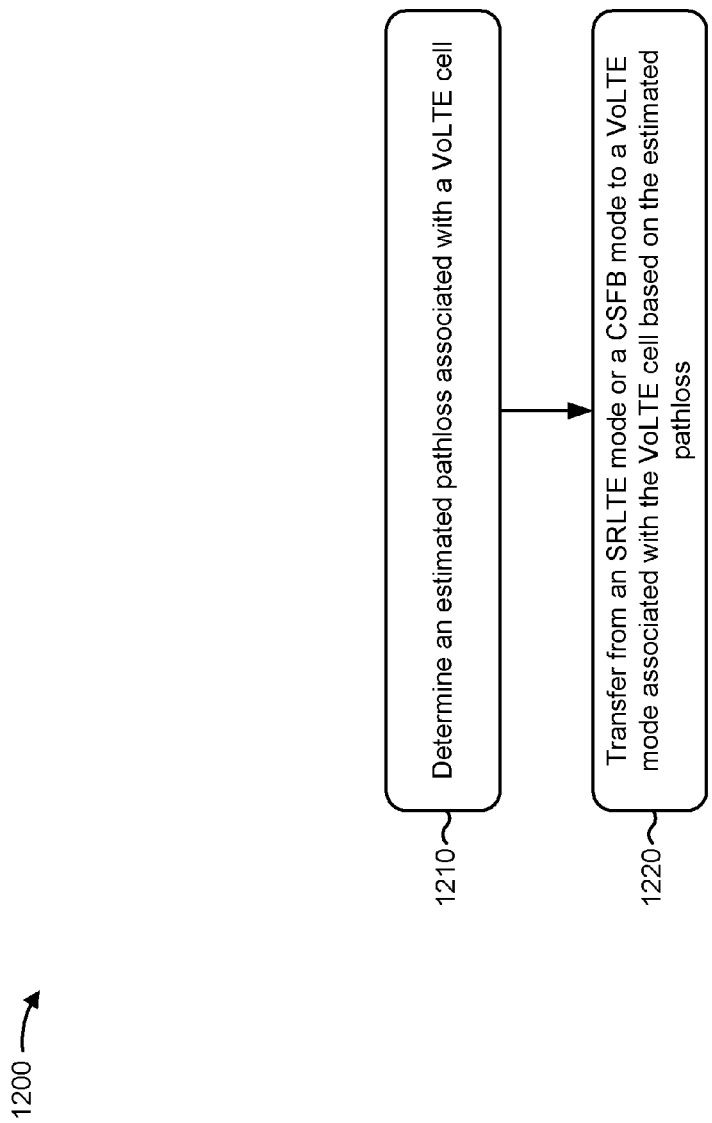
FIG. 12 is a flow chart of a method of wireless communication.

The apparatus 702 may include additional modules that perform each of the blocks of the algorithm in the flow charts of FIGS. 10, 11, 12, and/or 13. As such, each block in the aforementioned flow charts of FIGS. 10, 11, 12, and/or 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 8:
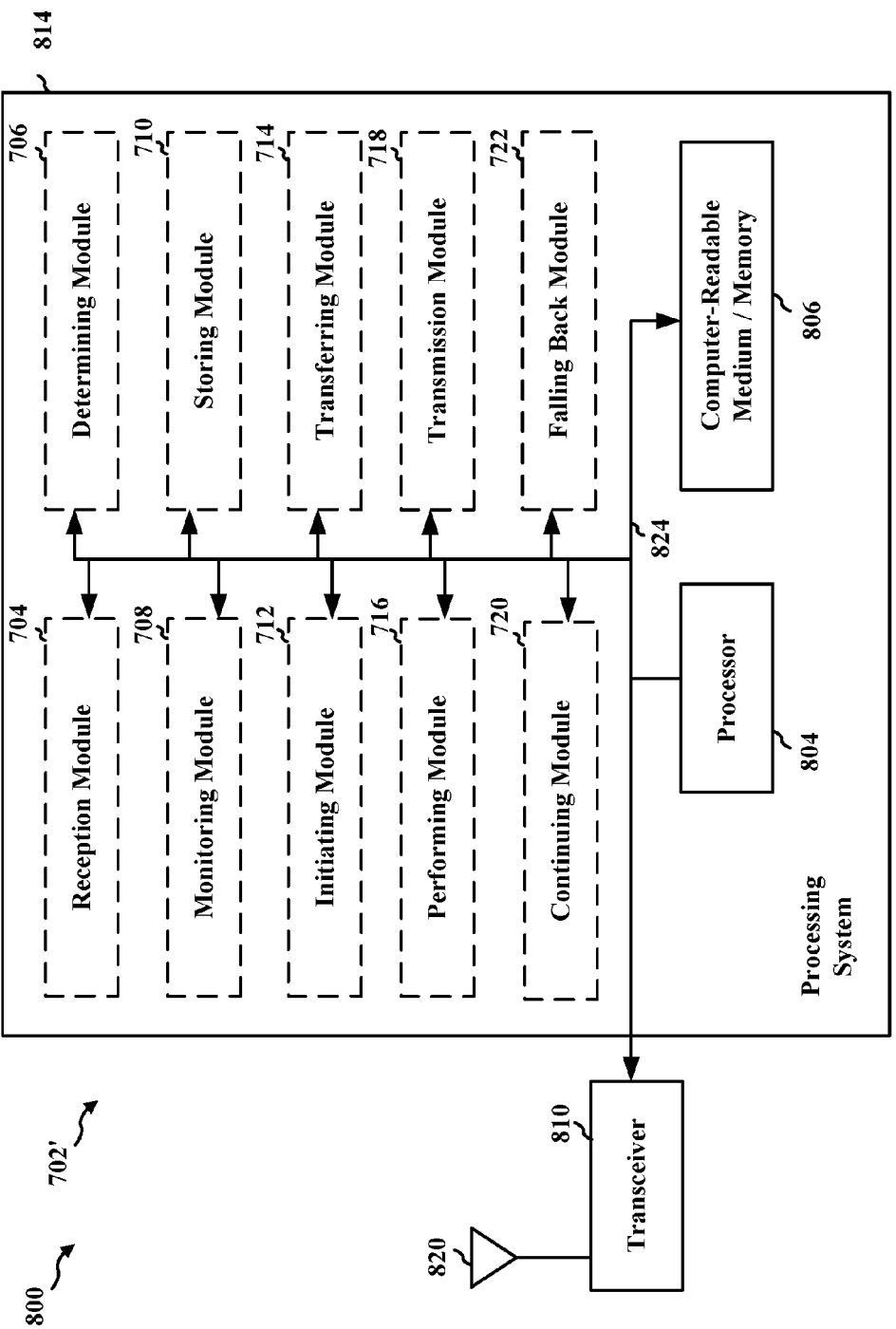
FIG. 8 is a diagram illustrating an example of a hardware implementation for an apparatus employing a processing system.

FIG. 8 is a diagram illustrating an example 800 of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, the modules 704, 706, 708, 710, 712, 714, 716, 718, 720, and 722 and the computer-readable medium/memory 806. The bus 824 may also link various other circuits such as timing sources, peripherals, voltage regulators, and power management circuits, which are well known in the art.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception module 704. In addition, the transceiver 810 receives information from the processing system 814, specifically the transmission module 718, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described infra for any particular apparatus. The computer-readable medium/memory 806 may also be used for storing data that is manipulated by the processor 804 when executing software. The processing system further includes at least one of the modules 704, 706, 708, 710, 712, 714, 716, 718, 720, and 722. The modules may be software modules running in the processor 804, resident/stored in the computer readable medium/memory 806, one or more hardware modules coupled to the processor 804, or some combination thereof. The processing system 814 may be a component of the UE 650 and may include the memory 660 and/or at least one of the TX processor 668, the RX processor 656, and the controller/processor 659.

In one configuration, the apparatus 702/702' for wireless communications includes means for determining that a VoLTE service has undergone a threshold quantity of failures within a particular period of time, means for transferring from a VoLTE mode associated with the VoLTE service to another mode for a voice call based on determining that the VoLTE service has undergone the threshold quantity of failures within the particular period of time, means for transferring, after transferring from the VoLTE mode to the other mode, from the other mode to a VoLTE mode associated with a second VoLTE service provided by a second cell, means for transferring from the VoLTE mode to an SRLTE mode or a CSFB mode, means for performing the voice call via the SRLTE mode or the CSFB mode, means for determining that the UE is unable to perform the voice call via the VoLTE service, means for transferring from the VoLTE mode to the other mode based on determining that the UE is unable to perform the voice call, means for monitoring a call attempt, means for storing call information identifying a failure associated with the call attempt, means for determining that the VoLTE service has undergone the threshold quantity of failures within the particular period of time based on the information identifying the failure associated with the call attempt, means for initiating a signal measurement associated with the other mode based on determining that the VoLTE service has undergone the threshold quantity of failures within the particular period of time, means for determining that the signal measurement satisfies one or more signal measurement criteria, means for transferring from the VoLTE mode to the other mode based on determining that the signal measurement satisfies the one or more signal measurement criteria, means for transmitting information to a cell associated with the other mode to attempt to register for service via the other mode, means for continuing to utilize the other mode based on successfully registering for service via the other mode, means for falling back to the VoLTE mode based on unsuccessfully registering for service via the other mode, means for determining a signal characteristic associated with the VoLTE mode, means for determining that the signal characteristic does not satisfy one or more signal characteristic criteria, means for transferring from the VoLTE mode to the other mode based on determining that the signal characteristic does not satisfy the one or more signal characteristic criteria, means for determining, after transferring from the VoLTE mode to the other mode, a signal characteristic associated with the VoLTE mode, means for determining that the signal characteristic satisfies one or more signal characteristic criteria, and/or means for transferring from the other mode to the VoLTE mode based on determining that the signal characteristic satisfies the one or more signal characteristic criteria.

In another configuration, the apparatus 702/702' for wireless communication includes means for determining, after transferring to an SRLTE mode or a CSFB mode, an estimated pathloss associated with a VoLTE cell, means for transferring from the SRLTE mode or the CSFB mode to a VoLTE mode associated with the VoLTE cell based on the estimated pathloss, means for determining a receiver sensitivity associated with the VoLTE cell, means for determining that an uplink transmission power for the UE satisfies a power threshold based on the receiver sensitivity associated with the VoLTE cell and the estimated pathloss associated with the VoLTE cell, means for transferring from the SRLTE mode or the CSFB mode to the VoLTE mode based on determining that the uplink transmission power for the UE satisfies the power threshold, means for determining that a set of transfer criteria associated with transferring to the SRLTE mode or the CSFB mode is satisfied, and/or means for transferring from the VoLTE mode to the SRLTE mode or the CSFB mode based on determining that the set of transfer criteria is satisfied and before determining the estimated pathloss.

The aforementioned means may be one or more of the aforementioned modules of the apparatus 702 and/or the processing system 814 of the apparatus 702' configured to perform the functions recited by the aforementioned means. As described supra, the processing system 814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 9:
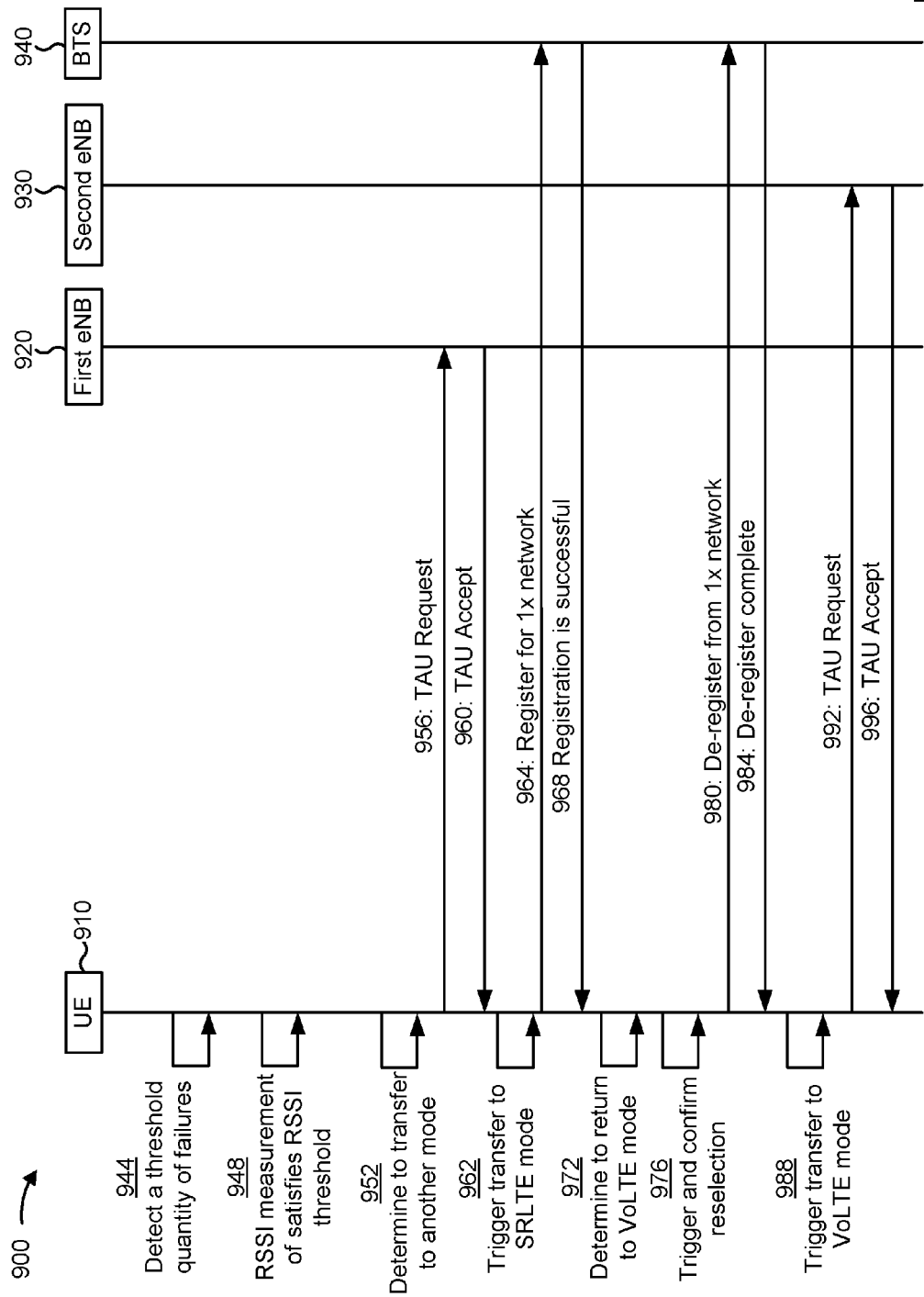
FIG. 9 is a diagram illustrating an example of switching from/to voice over long term evolution (VoLTE) for a voice call.

FIG. 9 is a diagram illustrating an example 900 of VoLTE to SRLTE switching based on a VoLTE failure. As shown in FIG. 9, example 900 may include a UE 910 (e.g., which may include one or more UE 102 of FIG. 1, the UE 206 of FIG. 2, the UE 650 of FIG. 6, the apparatus 702 of FIG. 7, the apparatus 702' of FIG. 8, etc.), a first eNB 920 (e.g., which may include one or more of the eNBs 106, 108 or the access point 130 of FIG. 1, the eNBs 204, 208 of FIG. 2, the eNB 610 of FIG. 6, the eNB 724 of FIG. 7, etc.), a second eNB 930 (e.g., which may include one or more of the eNBs 106, 108 or the access point 130 of FIG. 1, the eNBs 204, 208 of FIG. 2, the eNB 610 of FIG. 6, the eNB 724 of FIG. 7, etc.), and a 1× base transceiver station (BTS) 940 (e.g., e.g., which may include one or more of the eNBs 106, 108 or the access point 130 of FIG. 1, the eNBs 204, 208 of FIG. 2, the eNB 610 of FIG. 6, the eNB 724 of FIG. 7, etc.). In some implementations, BTS 940 may represent a portion of first eNB 920 that provides a 1× network (e.g., first eNB 920 and BTS 940 may represent a single group of devices that provides an LTE network and a 1× network).

As shown in FIG. 9, UE 910 and a first eNB 920 may be connected in a communication (e.g., for a VoLTE service via a VoLTE mode). As shown by reference number 944, UE 910 may detect a threshold quantity of failures when utilizing a VoLTE mode of first eNB 920. For example, UE 910 may detect a threshold quantity of consecutive failures, a threshold quantity of non-consecutive failures, or the like. In some aspects, UE 910 may detect the threshold quantity of failures within a particular period of time. In some aspects, UE 910 may store information identifying one or more failures, and may detect the threshold quantity of failures based on the stored information. For example, when UE 910 detects a failure associated with the VoLTE service provided by first eNB 920 via the VoLTE mode, UE 910 may record an indication of the failure via a data structure. In this case, UE 910 may determine that UE 910 has detected a threshold quantity of failures based on a threshold quantity of indications of failures being recorded via the data structure.

As further shown in FIG. 9, and by reference number 948, based on detecting the threshold quantity of failures, UE 910 may perform a signal strength measurement, and may determine that the signal strength measurement satisfies a threshold. For example, UE 910 may determine a received signal strength indication (RSSI) value associated with a 1× signal provided by BTS 940. In some aspects, UE 910 may periodically perform a measurement of the 1× signal, and may store information identifying the measurement for utilization after detecting the threshold quantity of failures. UE 910 may determine that the RSSI value of the 1× signal satisfies a threshold, thereby indicating that UE 910 can connect to an SRLTE mode of first eNB 920 provided via the 1× signal. As shown by reference number 952, UE 910 may trigger a switch to another mode (e.g., a voice only mode, such as an SRLTE mode, a CSFB mode, or the like). For example, UE 910 may determine to transfer of UE 910 to the SRLTE mode.

As further shown in FIG. 9, and by reference number 956, based on determining to transfer to the SRLTE mode, UE 910 may transmit a tracking area update (TAU) request to first eNB 920. For example, UE 910 may transmit a TAU request associated with permitting circuit switched (CS) voice calling for UE 910. As shown by reference number 956, when the TAU request is accepted (e.g., and performed successfully), UE 910 may receive, from first eNB 920, a TAU accept message. In some aspects, the TAU accept message may include CS registration information, and may cause UE 910 to transfer to a CSFB mode of first eNB 920. In some aspects, when the CSFB mode is not supported, the TAU accept message may lack CS registration information, and may cause UE 910 to transfer to an SRLTE mode and register for a 1× network. Additionally, or alternatively, UE 910 may camp on another RAT that supports CS calling. In some aspects, UE 910 may initiate an IMS deregistration procedure after receiving the TAU accept message.

As further shown in FIG. 9, and by reference numbers 962 and 964, based on the TAU request being accepted and CS registration information failing to be included, UE 910 may trigger a transfer to the SRLTE mode, and may transmit a request to register for a 1× network provided by BTS 940. For example, UE 910 may transfer to the SRLTE mode, and may transmit information associated with causing one or more 1× network resources to be allocated to UE 910. As shown by reference number 968, based on the network resources being allocated, UE 910 may receive, from BTS 940, information associated with indicating that registration for the 1× network is successful. In this case, UE 910 may perform a voice call via the SRLTE mode (e.g., via the 1× network). In this way, UE 910 is transferred to the SRLTE mode to perform voice calling via an SRLTE service.

As further shown in FIG. 9, and by reference number 972, UE 910 may determine to return to the VoLTE mode. For example, UE 910 may perform a pathloss estimation procedure to determine that a signal strength (e.g., an uplink transmission power of UE 910) is sufficient to connect to a VoLTE mode of second eNB 930. As shown by reference number 976, UE 910 may transmit a message to first eNB 920 to trigger a transfer to second eNB 930. As shown by reference number 976, UE 910 may trigger a reselection to second eNB 920 (e.g., via an idle mode). In this way, UE 910 transfers to eNB 920 to utilize the VoLTE mode. As shown by reference numbers 980 and 984, based on reselecting to second eNB 930, UE 910 may de-register from the 1× network provided by BTS 940. As shown by reference number 988, UE 910 may trigger a transfer to a VoLTE mode. For example, UE 910 may trigger a switch to the VoLTE mode. As shown by reference numbers 992 and 996, UE 910 may transmit a TAU request to permit UE 910 to utilize the VoLTE mode via second eNB 930, and may receive a TAU accept indicating that UE 910 is permitted to utilize the VoLTE mode via second eNB 930. In some aspects, UE 910 may receive a TAU reject, and UE 910 may be caused to remain utilizing a CSFB mode or an SRLTE mode. In this way, UE 910 returns to the VoLTE mode via a connection to another cell, thereby increasing a likelihood that UE 910 utilizes a preferred VoLTE mode rather than a non-preferred SRLTE mode or CSFB mode. Moreover, UE 910 improves network performance by reducing a likelihood of calls being rejected relative to remaining connected to the VoLTE mode of first eNB 920.

As indicated above, FIG. 9 is provided as an example. Other examples are possible and may differ from what was described in connection with FIG. 9.

FIG. 10 is a flow chart of a method 1000 of wireless communication. The method 1000 may be performed by a UE (e.g., which may include one or more UE 102 of FIG. 1, the UE 206 of FIG. 2, the UE 650 of FIG. 6, the apparatus 702 of FIG. 7, the apparatus 702' of FIG. 8, the UE 910 of FIG. 9, etc.).

At 1010, the UE may determine that a VoLTE service has undergone a threshold quantity of failures within a particular period of time. For example, as described in connection with FIG. 9, the UE 910 may determine that the VoLTE service being utilized by the UE 910 has undergone the threshold quantity of failures within the particular period of time. In some aspects, the threshold quantity of failures may be one (i.e., a single failure). In some aspects, the threshold quantity of failures may be a quantity of failures greater than one. In some aspects, the threshold quantity of failures may be a threshold quantity of consecutive failures. For example, the UE 910 may store information identifying a quantity of consecutive failures of the VoLTE service based on monitoring call attempts performed by the UE 910, and may determine that the quantity of consecutive failures exceeds a threshold. In some aspects, the threshold quantity of failures may relate to the UE 910 failing to perform a voice call via the VoLTE service. For example, UE 910 may attempt a voice call via the VoLTE service, and may fail to perform the voice call via the VoLTE service of a VoLTE mode provided by a cell (e.g., which may include one or more of the eNBs 106, 108 or the access point 130 of FIG. 1, the eNBs 204, 208 of FIG. 2, the eNB 610 of FIG. 6, the eNB 724 of FIG. 7, first eNB 920 of FIG. 9, etc.).

In some aspects, the UE may fail to perform the voice call based on a cell providing the VoLTE service (e.g., first eNB 920 of FIG. 9) being unavailable, a connection release, a signal characteristic failing to satisfy a set of signal characteristic criteria (e.g., a signal strength threshold, a signal characteristic threshold, etc.), or the like. For example, the set of signal characteristic criteria may include a threshold received signal strength indicator value, reference signal received power value, reference signal received quality value, or the like. In another example, the set of signal characteristic criteria may include an uplink transmission power of the UE 910 exceeding a threshold (e.g., a particular percentage of a maximum uplink transmission power, the maximum uplink transmission power, etc.). For example, at a cell edge, UE 910 may increase an uplink transmission power to continue to communicate with an eNB (e.g., first eNB 920 of FIG. 9) to a power level exceeding a threshold. In this case, UE 910 may be at a greater risk of call failure relative to a lower power level, may utilize a greater amount of power relative to a lower power level causing reduced operating time, or the like.

At 1020, the UE may transfer from a VoLTE mode associated with the VoLTE service to another mode for a voice call based on determining that the VoLTE service has undergone the threshold quantity of failures within the particular period of time. For example, as described in connection with FIG. 9, the UE 910 may transfer from the VoLTE mode associated with the VoLTE service to another mode for a voice call based on determining that the VoLTE service has undergone the threshold quantity of failures within the particular period of time. In some aspects, the other mode may be an SRLTE mode. For example, when the UE 910 supports an SRLTE and VoLTE hybrid mode and is connected to a cell (e.g., first eNB 920 of FIG. 9) providing a 1× network and an LTE network, the UE 910 may transfer to the 1× network of the cell for SRLTE service. Similarly, when the UE 910 supports CSFB, UE 910 may transfer to a CSFB mode for CSFB service.

In some aspects, the UE may transfer from the VoLTE mode to the other mode based on a signal measurement associated with the other mode. For example, the UE 910 may initiate a signal strength measurement of a 1× network to which the UE 910 is to transfer, may determine that the signal strength measurement of the 1× network satisfies a signal strength threshold, and may transfer to the other mode associated with the 1× network based on determining that the signal strength measurement of the 1× network satisfies the signal strength threshold.

In some aspects, the UE may register for the other mode when transferring from the VoLTE mode to the other mode. For example, the UE 910 may transmit information associated with attempting to register for an SRLTE service via an SRLTE mode. In this case, the UE 910 may utilize the SRLTE mode based on successfully registering for the SRLTE service via the SRLTE mode or fall back to the VoLTE mode based on failing to successfully register for the SRLTE service via the SRLTE mode. In this way, the UE 910 may reduce a likelihood that the UE 910 is not connected to any service via any mode relative to failing to fall back to the VoLTE mode upon failing to successfully register for the SRLTE service.

In some aspects, the UE may perform a voice call based on transferring to the other mode. For example, the UE 910 may perform an SRLTE voice call or a CSFB voice call via, respectively, an SRLTE service of the SRLTE mode or a CSFB service of the CSFB mode. In this way, the UE 910 improves call performance based on transferring to another mode when experiencing a threshold quantity of failures in a VoLTE mode.

In some aspects, the UE may determine a signal characteristic associated with a VoLTE mode provided by another cell (e.g., which may include one or more of the eNBs 106, 108 or the access point 130 of FIG. 1, the eNBs 204, 208 of FIG. 2, the eNB 610 of FIG. 6, the eNB 724 of FIG. 7, second eNB 930 of FIG. 9, etc.). For example, the UE 910 may determine that a signal quality of a VoLTE mode associated with second eNB 930 satisfies a signal quality threshold, and may determine to transfer to the VoLTE mode (e.g., a preferred mode relative to the other mode) of second eNB 930. In this case, the UE 910 may trigger the transfer to the VoLTE mode associated with second eNB 930, and may transfer to the VoLTE mode associated with second eNB 930 based on triggering the transfer. Additionally, or alternatively, the UE 910 may trigger a transfer to the VoLTE mode associated with first eNB 920 when connected via the SRLTE mode or the CSFB mode to eNB 920. For example, the UE 910 may determine that the VoLTE mode provided by first eNB 920 is associated with a signal characteristic that satisfies a set of signal characteristic criteria, and may return to utilizing the VoLTE mode provided by first eNB 920. In this way, the UE 910 may return to a preferred VoLTE mode without switching cells.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

FIG. 11 is a flow chart of a method 1100 of wireless communication. The method 1100 may be performed by a UE (e.g., which may include one or more UE 102 of FIG. 1, the UE 206 of FIG. 2, the UE 650 of FIG. 6, the apparatus 702 of FIG. 7, the apparatus 702' of FIG. 8, the UE 910 of FIG. 9, etc.).

At 1110, the UE may determine that a first VoLTE service provided by a first cell has undergone a threshold quantity of failures within a particular period of time. For example, as described above in connection with FIG. 9 and FIG. 10, the UE 910 may determine that the first VoLTE service provided by the first cell (e.g., which may include one or more of the eNBs 106, 108 or the access point 130 of FIG. 1, the eNBs 204, 208 of FIG. 2, the eNB 610 of FIG. 6, the eNB 724 of FIG. 7, first eNB 920 of FIG. 9, etc.) has undergone the threshold quantity of failures within the particular period of time.

At 1120, the UE may transfer from a VoLTE mode associated with the first VoLTE service to another mode for a voice call based on determining that the first VoLTE service has undergone the threshold quantity of failures within the particular period of time. For example, as described above in connection with FIG. 9 and FIG. 10, the UE 910 may transfer from the VoLTE mode associated with the first VoLTE service (e.g., provided via first eNB 920 of FIG. 9) to another mode (e.g., an SRLTE mode or a CSFB mode) for a voice call based on determining that the first VoLTE service has undergone the threshold quantity of failures within the particular period of time. In some aspects, the other mode and the VoLTE mode may be associated with the same cell. For example, when the UE 910 transfers to the other mode, the UE 910 may transfer to a 1× network (e.g., provided via first eNB 920 of FIG. 9). In some aspects, the other mode and the VoLTE mode may be associated with different devices associated with the same cell area. For example, UE 910 may transfer from a VoLTE mode provided by eNB 106 of FIG. 1 to an SRLTE mode provided by access point 130 of FIG. 1, which are associated with a single cell area.

In some aspects, the UE may perform a measurement associated with a second VoLTE service when connected to the other mode. For example, when the UE 910 transfers from the VoLTE mode to and connects to the SRLTE mode, the UE 910 may, periodically, perform a measurement of one or more signal characteristics of a VoLTE mode provided by another cell (e.g., which may include one or more of the eNBs 106, 108 or the access point 130 of FIG. 1, the eNBs 204, 208 of FIG. 2, the eNB 610 of FIG. 6, the eNB 724 of FIG. 7, second eNB 930 of FIG. 9, etc.) providing a second VoLTE service. In this case, the UE 910 may determine that the one or more signal characteristics associated with second eNB 930 satisfy a set of signal characteristic criteria (e.g., signal strength criteria, signal quality criteria, etc.), and may transfer to the other cell based on determining that the one or more signal characteristics satisfy the set of signal characteristic criteria. In some aspects, the UE may determine an estimated pathloss. For example, based on performing a pathloss estimation procedure, the UE 910 may determine that the UE is capable of connecting to the other cell for voice calls based on the estimated pathloss, and may determine to connect to the other cell based on determining that the UE is capable of connecting to the other cell for voice calls.

At 1130, the UE may transfer from the other mode to the VoLTE mode associated with a second VoLTE service provided by a second cell. For example, as described above in connection with FIG. 9 and FIG. 10, the UE 910 may transfer from the other mode to the VoLTE mode associated with the second VoLTE service provided by the second cell (e.g., second eNB 930 of FIG. 9). In some aspects, the UE may transfer from a first cell to the second cell based on a signal characteristic of the second VoLTE service provided by the second cell. For example, when the UE 910 is connected to the other mode (e.g., an SRLTE mode or a CSFB mode) of the first cell, the UE 910 may determine that the signal characteristic satisfies one or more signal characteristic criteria, and may transfer from the first cell to the second cell to utilize the VoLTE mode. In this way, the UE increases a likelihood of connecting to a preferred VoLTE mode relative to remaining on the first cell (e.g., until a signal characteristic of the VoLTE mode on the first cell improves).

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

FIG. 12 is a flow chart of a method 1200 of wireless communication. The method 1200 may be performed by a UE (e.g., which may include one or more UE 102 of FIG. 1, the UE 206 of FIG. 2, the UE 650 of FIG. 6, the apparatus 702 of FIG. 7, the apparatus 702' of FIG. 8, the UE 910 of FIG. 9, etc.).

At 1210, the UE may determine an estimated pathloss associated with a VoLTE cell. For example, as described above in connection with FIG. 9, the UE 910 may determine the estimated pathloss associated with the VoLTE cell (e.g., which may include one or more of the eNBs 106, 108 or the access point 130 of FIG. 1, the eNBs 204, 208 of FIG. 2, the eNB 610 of FIG. 6, the eNB 724 of FIG. 7, second eNB 930 of FIG. 9, etc.). In some aspects, the estimated pathloss may be associated with an estimated quantity of transmission power by which an uplink transmission is reduced when transmitted to the VoLTE cell. For example, the UE 910 may determine, based on a configuration of UE 910, one or more measurements, received information, or the like, an estimated reduction in uplink transmission power associated with transmitting to the VoLTE cell. In some aspects, the uplink transmission power may be an open loop transmission power. In some aspects, the UE may determine the estimated pathloss without performing a measurement. For example, the UE 910 may determine the estimated pathloss without transmitting a signal to the VoLTE cell for measurement or performing a measurement on a signal received from the VoLTE cell. In this case, UE 910 may utilize signaling information and/or stored information to perform a pathloss estimation procedure.

In some aspects, the UE may determine the estimated pathloss after transferring from a VoLTE mode associated with another cell to another mode associated with the other cell. For example, based on determining that a set of transfer criteria is satisfied, the UE 910 may transfer from a VoLTE mode provided by the other cell to an SRLTE mode or a CSFB mode provided by the other cell. In this case, the UE 910 may perform the pathloss estimation to trigger a transfer to the VoLTE mode provided by the VoLTE cell. In this way, UE 910 increases a likelihood of returning to a preferred VoLTE mode relative to remaining connected to the other cell until a signal characteristic of the other cell satisfies a set of signal characteristic criteria.

In some aspects, the set of signal characteristic criteria may include the UE undergoing a threshold quantity of failures when connected to the VoLTE mode provided by the other cell, the UE being unable to perform a voice call via the VoLTE mode provided by the other cell, a signal measurement (e.g., of the SRLTE mode or the CSFB mode) satisfying one or more signal measurement criteria, a signal characteristic (e.g., of a VoLTE mode associated with another cell) failing to satisfy one or more signal characteristic criteria, or the like, as described above with regard to FIG. 9, FIG. 10, and FIG. 11.

At 1220, the UE may transfer from an SRLTE mode or a CSFB mode to a VoLTE mode associated with the VoLTE cell based on the estimated pathloss. For example, as described above in connection with FIG. 9, the UE 910 may transfer from the SRLTE mode or the CSFB mode (e.g., provided by the first eNB 920 of FIG. 9) to the VoLTE mode associated with the VoLTE cell (e.g., the second eNB 930 of FIG. 9) based on the estimated pathloss. In some aspects, the UE may determine whether an uplink transmission power (e.g., an open loop transmission power) satisfies a power threshold based on the estimated pathloss. For example, the UE 910 may determine a receiver sensitivity associated with the VoLTE cell, and may determine based on an uplink transmission power of the UE 910, the estimated pathloss, and the receiver sensitivity, whether the UE 910 can communicate with the VoLTE cell. In this case, when UE 910 determines that UE 910 can communicate with the VoLTE cell based on the uplink transmission power satisfying the power threshold, UE 910 may transfer to the VoLTE cell to utilize a VoLTE mode. In this way, UE 910 returns to a preferred VoLTE mode improving network performance relative to remaining connected to a non-preferred SRLTE mode or CSFB mode (e.g., based on improved throughput, reduced network resources utilized, etc.).

In some aspects, the UE 910 may register for the VoLTE mode after transferring to the VoLTE cell. For example, the UE 910 may transfer one or more messages associated with de-registering from an SRLTE mode or a CSFB mode and registering for a VoLTE mode, thereby permitting UE 910 to perform a voice call via a VoLTE service. In this case, UE 910 may remain connected to the VoLTE mode based on successfully registering for the VoLTE mode, and may fall back to the SRLTE mode or the CSFB mode based on failing to successfully register for the VoLTE mode.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

FIG. 13 is a flow chart of a method 1300 of wireless communication. The method 1300 may be performed by a UE (e.g., which may include one or more UE 102 of FIG. 1, the UE 206 of FIG. 2, the UE 650 of FIG. 6, the apparatus 702 of FIG. 7, the apparatus 702' of FIG. 8, the UE 910 of FIG. 9, etc.).

At 1310, the UE may determine that a set of transfer criteria associated with transferring to an SRLTE mode or a CSFB mode is satisfied. For example, as described above in connection with FIG. 9 and FIG. 12, the UE 910 may determine that the set of transfer criteria associated with transferring to the SRLTE mode or the CSFB mode is satisfied. In some aspects, the set of transfer criteria may include the UE 910 undergoing a threshold quantity of failures, associated with a VoLTE mode, within a particular period of time, the UE 910 being unable to perform a voice call via the VoLTE mode, a signal measurement, associated with the SRLTE mode or the CSFB mode satisfying one or more signal measurement criteria, a signal characteristic failing to satisfy one or more signal characteristic criteria, or the like. For example, the UE 910 may determine that a particular quantity of consecutive failures have occurred when connected to the VoLTE mode for a VoLTE service. In another example, the UE 910 may determine that the UE 910 is unable to perform a voice call and that the SRLTE mode is associated with a signal strength that satisfies a threshold.

At 1320, the UE may transfer from a VoLTE mode to the SRLTE mode or the CSFB mode based on determining that the set of transfer criteria is satisfied. For example, as described above in connection with FIG. 9 and FIG. 12, the UE 910 may transfer from the VoLTE mode to the SRLTE mode or the CSFB mode based on determining that the set of transfer criteria is satisfied. In some aspects, the UE may register for the SRLTE mode or the CSFB mode. For example, the UE 910 may de-register from the VoLTE mode and may attempt to register for the SRLTE mode or the CSFB mode. In this case, when the UE 910 is unsuccessful registering for the SRLTE mode or the CSFB mode, the UE 910 may fall back to the VoLTE mode. In this way, the UE increases a likelihood of maintaining a network connection, relative to disconnecting from the SRLTE mode or the CSFB mode without falling back to the VoLTE mode.

At 1330, the UE may determine an estimated pathloss associated with a VoLTE cell. For example, as described above in connection with FIG. 9 and FIG. 12, the UE 910 may determine the estimated pathloss associated with the VoLTE cell (e.g., which may include one or more of the eNBs 106, 108 or the access point 130 of FIG. 1, the eNBs 204, 208 of FIG. 2, the eNB 610 of FIG. 6, the eNB 724 of FIG. 7, second eNB 930 of FIG. 9, etc.). In some aspects, the UE may determine an open loop transmission power threshold for transmitting to the VoLTE cell. For example, the UE 910 may determine that the UE 910 is capable of transmitting at an open loop transmission power greater than the open loop transmission power threshold. In this case, the UE 910 may trigger a transfer from the SRLTE mode or the CSFB mode to a VoLTE mode provided by the VoLTE cell.

At 1340, the UE may transfer from the SRLTE mode or the CSFB mode to a VoLTE mode based on the estimated pathloss. For example, as described above in connection with FIG. 9 and FIG. 12, the UE 910 may transfer from the SRLTE mode or the CSFB mode to the VoLTE mode (e.g., provided by a VoLTE cell, which may include one or more of the eNBs 106, 108 or the access point 130 of FIG. 1, the eNBs 204, 208 of FIG. 2, the eNB 610 of FIG. 6, the eNB 724 of FIG. 7, second eNB 930 of FIG. 9, etc.). In some aspects, the UE may transfer from a cell that provides a VoLTE mode. For example, after transferring from the VoLTE mode of a first cell (e.g., which may include one or more of the eNBs 106, 108 or the access point 130 of FIG. 1, the eNBs 204, 208 of FIG. 2, the eNB 610 of FIG. 6, the eNB 724 of FIG. 7, first eNB 920 of FIG. 9, etc.) to a SRLTE mode or a CSFB mode of the first cell, the UE 910 may transfer to the VoLTE mode of a second cell, thereby permitting the UE 910 to utilize a VoLTE mode when the first cell remains associated with a poor signal strength, a poor signal quality, or the like. In this way, the UE improves network performance by increasing a likelihood of successfully placing a call via a VoLTE network relative to failing to transfer from the first cell to the second cell.

Although FIG. 13 shows example blocks of a method of wireless communication, in some aspects, the method may include additional blocks, fewer blocks, different blocks, or differently arranged blocks than those shown in FIG. 13. Additionally, or alternatively, two or more blocks shown in FIG. 13 may be performed in parallel.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for." Further, the phrase "based on" is intended to mean "based, at least in part, on" unless explicitly stated otherwise.

What is claimed is:

1. A method for wireless communication, comprising:
   determining, by a user equipment (UE), that attempts at a voice call using a voice over long term evolution (VoLTE) service have encountered a threshold quantity of failures within a particular period of time; and
   transferring, by the UE, from a VoLTE mode associated with the VoLTE service to another mode for the voice call based on determining that attempts at the voice call using the VoLTE service have encountered the threshold quantity of failures within the particular period of time.

2. The method of claim 1, where the VoLTE service is a first VoLTE service provided by a first cell; and
   the method further comprising:
   transferring, after transferring from the VoLTE mode to the other mode, from the other mode to the VoLTE mode associated with a second VoLTE service provided by a second cell.

3. The method of claim 1, where transferring from the VoLTE mode to the other mode comprises:
   transferring from the VoLTE mode to a single radio long term evolution (SRLTE) mode or a circuit switched fall back (CSFB) mode; and
   performing the voice call via the SRLTE mode or the CSFB mode.

4. The method of claim 1, where the threshold quantity of failures is a threshold quantity of consecutive failures.

5. The method of claim 1, further comprising:
   determining that the UE is unable to perform the voice call via the VoLTE service; and
   where transferring from the VoLTE mode to the other mode comprises:
   transferring from the VoLTE mode to the other mode based on determining that the UE is unable to perform the voice call.

6. The method of claim 1, further comprising:
   monitoring an attempt at the voice call;
   storing information identifying a failure associated with the attempt at the voice call; and
   where determining that attempts at the voice call using the VoLTE service have encountered the threshold quantity of failures within the particular period of time comprises:
   determining that attempts at the voice call using the VoLTE service have encountered the threshold quantity of failures within the particular period of time based on the information identifying the failure associated with the attempt at the voice call.

7. The method of claim 1, further comprising:
   initiating a signal measurement associated with the other mode based on determining that attempts at the voice call using the VoLTE service have encountered the threshold quantity of failures within the particular period of time;
   determining that the signal measurement satisfies one or more signal measurement criteria; and
   where transferring from the VoLTE mode to the other mode comprises:
   transferring from the VoLTE mode to the other mode based on determining that the signal measurement satisfies the one or more signal measurement criteria.

8. The method of claim 1, further comprising:
   transmitting information to a cell associated with the other mode to attempt to register for service via the other mode; and
   continuing to utilize the other mode based on successfully registering for service via the other mode, or
   falling back to the VoLTE mode based on unsuccessfully registering for service via the other mode.

9. The method of claim 1, further comprising:
   determining a signal characteristic associated with the VoLTE mode;
   determining that the signal characteristic does not satisfy one or more signal characteristic criteria; and
   where transferring from the VoLTE mode to the other mode comprises:
   transferring from the VoLTE mode to the other mode based on determining that the signal characteristic does not satisfy the one or more signal characteristic criteria.

10. The method of claim 1, further comprising:
    determining, after transferring from the VoLTE mode to the other mode, a signal characteristic associated with the VoLTE mode;
    determining that the signal characteristic satisfies one or more signal characteristic criteria; and
    transferring from the other mode to the VoLTE mode based on determining that the signal characteristic satisfies the one or more signal characteristic criteria.

11. A method for wireless communication, comprising:
    determining, by a user equipment (UE), that a set of transfer criteria associated with transferring to a single radio long term evolution (SRLTE) mode or a circuit switched fall back (CSFB) mode is satisfied;
    transferring, by the UE, from a voice over long term evolution (VoLTE) mode to the SRLTE mode or the CSFB mode based on determining that the set of transfer criteria is satisfied;
    determining, by the UE and after transferring to the SRLTE mode or the CSFB mode, an estimated pathloss associated with a VoLTE cell; and
    transferring, by the UE, from the SRLTE mode or the CSFB mode to the VoLTE mode associated with the VoLTE cell based on the estimated pathloss.

12. The method of claim 11, further comprising:
    determining a receiver sensitivity associated with the VoLTE cell;
    determining that an uplink transmission power for the UE satisfies a power threshold based on the receiver sensitivity associated with the VoLTE cell and the estimated pathloss associated with the VoLTE cell; and
    where transferring from the SRLTE mode or the CSFB mode to the VoLTE mode further comprises:
    transferring from the SRLTE mode or the CSFB mode to the VoLTE mode based on determining that the uplink transmission power for the UE satisfies the power threshold.

13. The method of claim 12, where the uplink transmission power is an open loop transmission power.

14. The method of claim 11, where the set of transfer criteria includes at least one of:
    the UE encountering a threshold quantity of failures, associated with the VoLTE mode, within a particular period of time,
    the UE being unable to perform a voice call via the VoLTE mode,
    a signal measurement satisfying one or more signal measurement criteria, or
    a signal characteristic failing to satisfy one or more signal characteristic criteria.

15. A device for wireless communication, comprising:
one or more processors configured to:
determine that attempts at a voice call using a voice over long term evolution (VoLTE) service have encountered a threshold quantity of failures within a particular period of time; and
transfer from a VoLTE mode associated with the VoLTE service to another mode for the voice call based on determining that attempts at the voice call using the VoLTE service have encountered the threshold quantity of failures within the particular period of time.

16. The device of claim 15, where the VoLTE service is a first VoLTE service provided by a first cell; and
where the one or more processors are further configured to:
transfer, after transferring from the VoLTE mode to the other mode, from the other mode to the VoLTE mode associated with a second VoLTE service provided by a second cell.

17. The device of claim 15, where the one or more processors, when transferring from the VoLTE mode to the other mode, are configured to:
transfer from the VoLTE mode to a single radio long term evolution (SRLTE) mode or a circuit switched fall back (CSFB) mode; and
perform the voice call via the SRLTE mode or the CSFB mode.

18. The device of claim 15, where the threshold quantity of failures is a threshold quantity of consecutive failures.

19. The device of claim 15, where the one or more processors are further configured to:
determine that the device is unable to perform the voice call via the VoLTE service; and
where the one or more processors, when transferring from the VoLTE mode to the other mode, are configured to:
transfer from the VoLTE mode to the other mode based on determining that the device is unable to perform the voice call.

20. The device of claim 15, where the one or more processors are further configured to:
monitor an attempt at the voice call;
store information identifying a failure associated with the attempt at the voice call; and
where the one or more processors, when determining that attempts at the voice call using the VoLTE service have encountered the threshold quantity of failures within the particular period of time, are configured to:
determine that attempts at the voice call using the VoLTE service have encountered the threshold quantity of failures within the particular period of time based on the information identifying the failure associated with the attempt at the voice call.

21. The device of claim 15, where the one or more processors are further configured to:
initiate a signal measurement associated with the other mode based on determining that attempts at the voice call the VoLTE service have encountered the threshold quantity of failures within the particular period of time;
determine that the signal measurement satisfies one or more signal measurement criteria; and
where the one or more processors, when transferring from the VoLTE mode to the other mode, are configured to:
transfer from the VoLTE mode to the other mode based on determining that the signal measurement satisfies the one or more signal measurement criteria.

22. The device of claim 15, where the one or more processors are further configured to:
transmit information to a cell associated with the other mode to attempt to register for service via the other mode; and
continue to utilize the other mode based on successfully registering for service via the other mode, or
fall back to the VoLTE mode based on unsuccessfully registering for service via the other mode.

23. The device of claim 15, where the one or more processors are further configured to:
determine a signal characteristic associated with the VoLTE mode;
determine that the signal characteristic does not satisfy one or more signal characteristic criteria; and
where the one or more processors, when transferring from the VoLTE mode to the other mode, are configured to:
transfer from the VoLTE mode to the other mode based on determining that the signal characteristic does not satisfy the one or more signal characteristic criteria.

24. The device of claim 15, where the one or more processors are further configured to:
determine, after transferring from the VoLTE mode to the other mode, a signal characteristic associated with the VoLTE mode;
determine that the signal characteristic satisfies one or more signal characteristic criteria; and
transfer from the other mode to the VoLTE mode based on determining that the signal characteristic satisfies the one or more signal characteristic criteria.

25. A device for wireless communication, comprising:
one or more processors configured to:
determine that a set of transfer criteria associated with transferring to a single radio long term evolution (SRLTE) mode or a circuit switched fall back (CSFB) mode is satisfied;
transfer from a voice over long term evolution (VoLTE) mode to the SRLTE mode or the CSFB mode based on determining that the set of transfer criteria is satisfied:
determine, after transferring to the SRLTE mode or the CSFB mode, an estimated pathloss associated with a VoLTE cell; and
transfer from the SRLTE mode or the CSFB mode to the VoLTE mode associated with the VoLTE cell based on the estimated pathloss.

26. The device of claim 25, where the one or more processors are further configured to:
determine a receiver sensitivity associated with the VoLTE cell;
determine that an uplink transmission power for the device satisfies a power threshold based on the receiver sensitivity associated with the VoLTE cell and the estimated pathloss associated with the VoLTE cell; and
where the one or more processors, when transferring from the SRLTE mode or the CSFB mode to the VoLTE mode, are further configured to:
transfer from the SRLTE mode or the CSFB mode to the VoLTE mode based on determining that the uplink transmission power for the device satisfies the power threshold.

27. The device of claim 26, where the uplink transmission power is an open loop transmission power.

28. The device of claim 25, where the set of transfer criteria includes at least one of:
the device encountering a threshold quantity of failures, associated with the VoLTE mode, within a particular period of time, the device being unable to perform a voice call via the VoLTE mode, a signal measurement satisfying one or more signal measurement criteria, or a signal characteristic failing to satisfy one or more signal characteristic criteria.

\* \* \* \* \*